(12) United States Patent
Kiyooka et al.

(10) Patent No.: US 12,441,450 B2
(45) Date of Patent: Oct. 14, 2025

(54) MARINE PROPULSION APPARATUS

(71) Applicant: Kanzaki Kokyukoki Manufacturing Co., Ltd., Amagasaki (JP)

(72) Inventors: Koji Kiyooka, Amagasaki (JP); Tomoyuki Ebihara, Amagasaki (JP); Takashi Nishizawa, Amagasaki (JP); Koga Yamane, Amagasaki (JP); Kengo Sasahara, Amagasaki (JP); Shigeaki Nakagawa, Amagasaki (JP); Kazuki Yasui, Amagasaki (JP); Toshiaki Okanishi, Amagasaki (JP)

(73) Assignee: KANZAKI KOKYUKOKI MANUFACTURING CO., LTD., Amagasaki (JP)

( * ) Notice: Subject to any disclaimer, the term of this patent is extended or adjusted under 35 U.S.C. 154(b) by 627 days.

(21) Appl. No.: 17/633,419

(22) PCT Filed: Jul. 20, 2020

(86) PCT No.: PCT/JP2020/028112
§ 371 (c)(1),
(2) Date: Feb. 7, 2022

(87) PCT Pub. No.: WO2021/024779
PCT Pub. Date: Feb. 11, 2021

(65) Prior Publication Data
US 2022/0289355 A1    Sep. 15, 2022

(30) Foreign Application Priority Data

Aug. 8, 2019   (JP) .............................. 2019-145921
Aug. 8, 2019   (JP) .............................. 2019-145922

(51) Int. Cl.
  *B63H 23/16*   (2006.01)
  *B63H 23/30*   (2006.01)
  *F03B 13/26*   (2006.01)

(52) U.S. Cl.
  CPC ............ *B63H 23/16* (2013.01); *B63H 23/30* (2013.01); *F03B 13/26* (2013.01); *F05B 2220/706* (2013.01); *F05B 2240/93* (2013.01)

(58) Field of Classification Search
  CPC ........ B63H 23/12; B63H 23/16; B63H 23/18; B63H 2021/202; B63H 2021/205; B63H 23/30; F03B 13/26; B63B 2209/14
  See application file for complete search history.

(56) References Cited

U.S. PATENT DOCUMENTS 3,619,632 A * 11/1971 Labombarde .............. B63J 3/04
                                                        114/39.21
4,316,722 A   2/1982 Aschauer
(Continued)

FOREIGN PATENT DOCUMENTS

JP   2008024187 A   2/2008
JP   2008222203 A   9/2008
(Continued)

OTHER PUBLICATIONS

International Search Report for International Application No. PCT/JP2020/028112; Date of Mailing, Sep. 24, 2020.

*Primary Examiner* — Andrew Polay
(74) *Attorney, Agent, or Firm* — CANTOR COLBURN LLP

(57) ABSTRACT

In a marine propulsion apparatus that transmits power of at least one of an internal combustion engine (ICE) and a generator motor (GM) mounted on a ship to a propeller via a forward reverse switching mechanism, the marine propulsion apparatus can be downsized as a whole. The marine propulsion apparatus includes a connection switching mechanism capable of selectively connecting the GM to an upstream side and a downstream side of the power transmission from the ICE in the forward reverse switching mechanism. Then, the forward reverse switching mechanism is interposed between the ICE and the connection switching mechanism, and a large torque from the ICE is not directly transmitted to the connection switching mechanism. As a result, it is not necessary to increase the capacity of the connection switching mechanism, and the connection switching mechanism and thus the marine propulsion apparatus can be downsized.

7 Claims, 20 Drawing Sheets

(56) References Cited

U.S. PATENT DOCUMENTS

| | | | |
|---|---|---|---|
| 7,353,768 B1* | 4/2008 | Jones | B63G 8/001 |
| | | | 114/337 |
| 2006/0054074 A1* | 3/2006 | Wingett | B63G 8/001 |
| | | | 114/312 |
| 2009/0029607 A1 | 1/2009 | Ryugo et al. | |
| 2017/0240261 A1* | 8/2017 | Marttila | H02K 11/21 |
| 2017/0355258 A1* | 12/2017 | Hawksley | B63H 23/12 |
| 2018/0086428 A1 | 3/2018 | Ebihara | |
| 2020/0377186 A1* | 12/2020 | Thompson | H01M 50/249 |

FOREIGN PATENT DOCUMENTS

| | | |
|---|---|---|
| JP | 4445089 B | 4/2010 |
| JP | 2013035297 A | 2/2013 |
| JP | 2017193224 A | 10/2017 |
| JP | 2018053936 A | 4/2018 |
| JP | 2018203145 A | 12/2018 |

\* cited by examiner

FIG.8A  FIG.8B
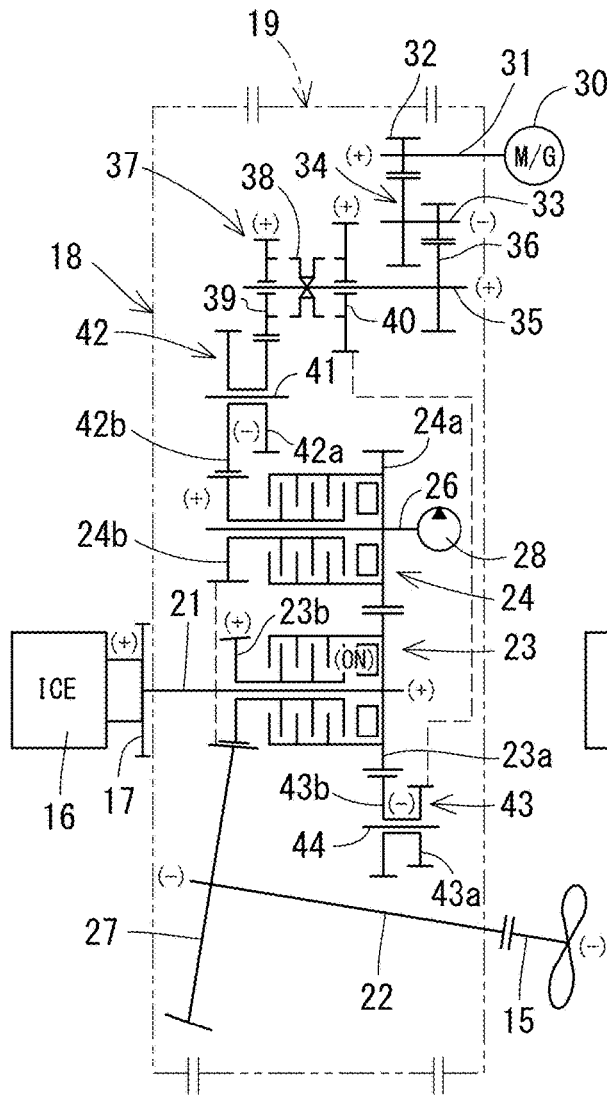
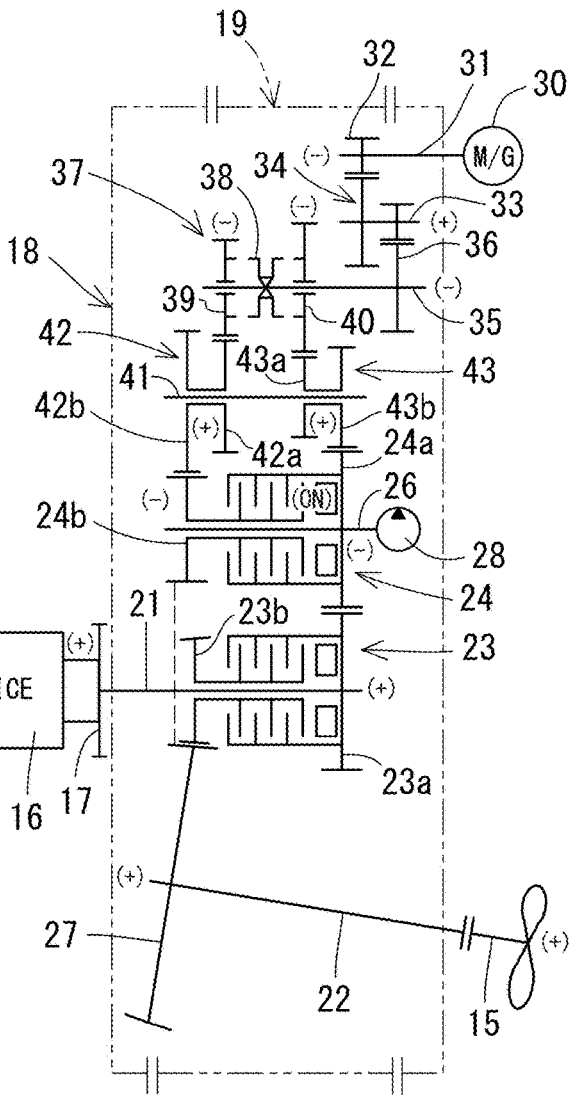
FIG.8C
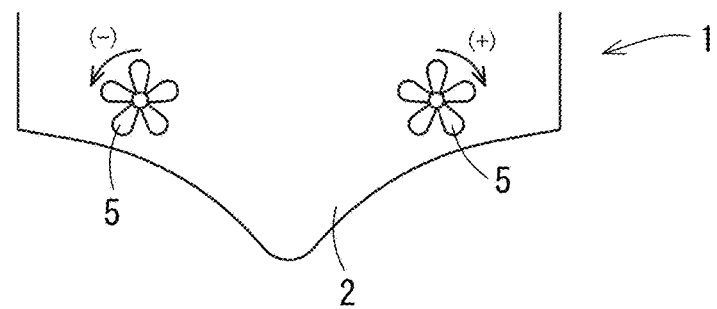

FIG.10A
FIG.10B
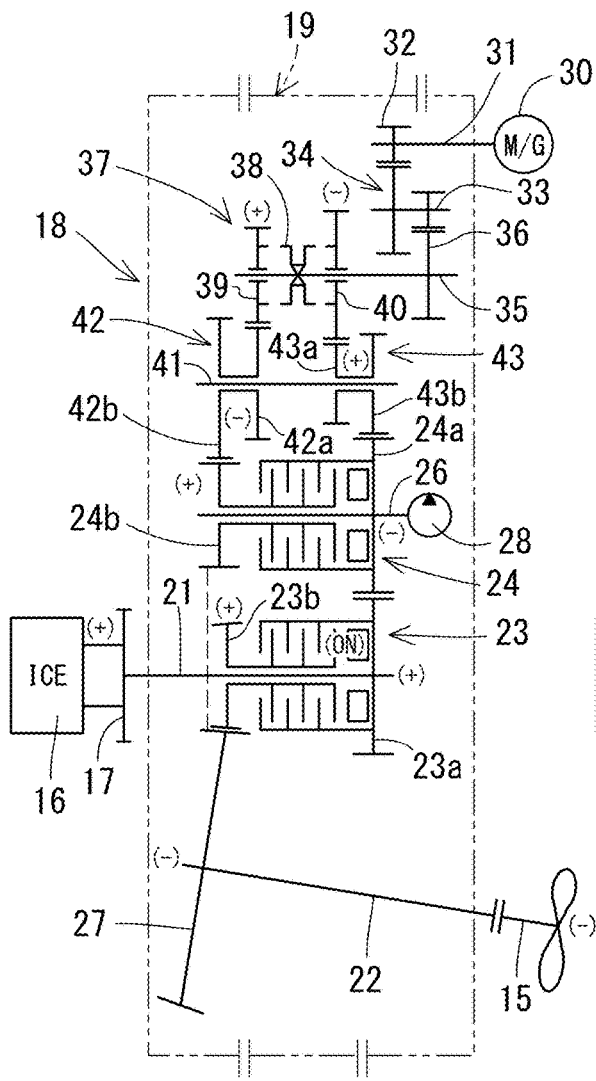
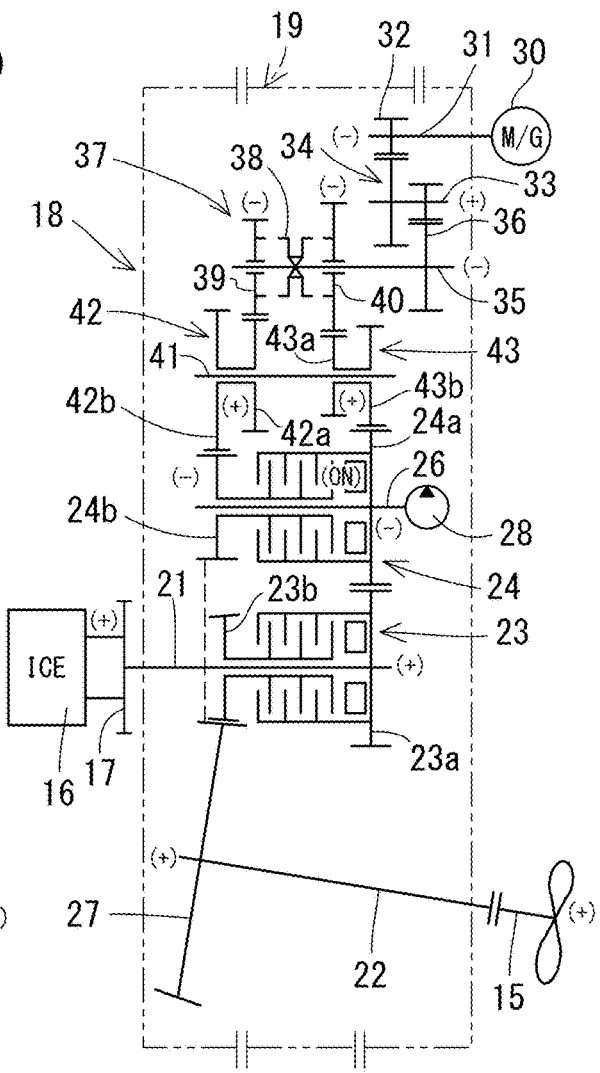
FIG.10C
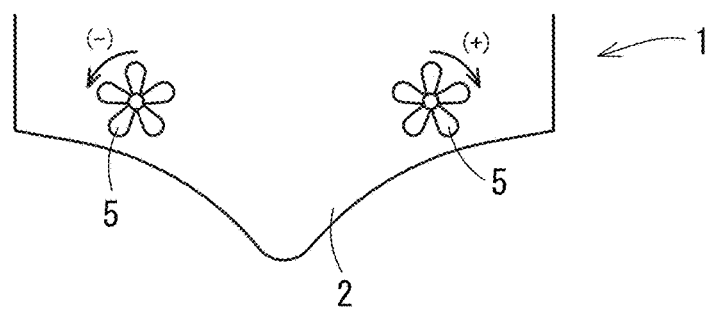

MARINE PROPULSION APPARATUS

CROSS REFERENCE TO PRIOR APPLICATIONS

This is the U.S. national stage of application No. PCT/JP2020/028112, filed on Jul. 20, 2020. Priority under 35 U.S.C. § 119(a) and 35 U.S.C. § 365(b) is claimed from Japanese Application No. 2019-145921 and Japanese Application No. 2019-145922 both filed on Aug. 8, 2019, the disclosures of both of which are also incorporated herein by reference.

TECHNICAL FIELD

The present invention relates to a so-called hybrid marine propulsion apparatus in which a ship is equipped with an internal combustion engine (hereinafter referred to as ICE) and a generator motor (hereinafter referred to as GM), and a propeller is rotated by the power of one or both of them.

BACKGROUND ART

Conventionally, in marine propulsion apparatuses such as pleasure boats, a so-called hybrid type that uses both ICE power and electric motor power to improve the efficiency of driving has been known (see, for example, Patent Literature 1). In the marine propulsion apparatus illustrated in FIG. 6 of Patent Literature 1, an ICE output shaft penetrates the marine propulsion apparatus, and is coupled to a generator. When navigating by the ICE, the generator is designed to generate power at all times. A transmission clutch is disposed in the marine propulsion apparatus. An electric motor is disposed on a propeller propulsion shaft. In this case, when the transmission clutch is connected, the power of the ICE is transmitted to the propeller propulsion shaft via the transmission clutch, and the propeller is rotated by the power of the ICE. When the transmission clutch is disengaged and the electric motor is driven, the propeller rotates by the power of the electric motor.

CITATION LIST

Patent Literature

Patent Literature 1: JP 4445089 B2

SUMMARY OF INVENTION

Technical Problem to be Solved

However, in the marine propulsion apparatus of Patent Literature 1, the transmission clutch is designed to receive the ICE power directly, and thus the transmission clutch per se must have a large enough capacity to withstand the large torque from the ICE. This has led to the issue of increasing the size of the entire marine propulsion apparatus, which in turn increases the cost. In addition, the marine propulsion apparatus of Patent Literature 1 includes a generator and an electric motor separately, but it is considered that if a GM having a generator function is employed, the marine propulsion apparatus can be made more compact.

Means for Solving the Problems

The technical issue of the present invention is to provide a marine propulsion apparatus with improvements based on consideration of the current situation as described above.

The marine propulsion apparatus of the present invention can transmit power of an internal combustion engine mounted on a ship to a propeller via a forward reverse switching mechanism, and includes a generator motor, and a connection switching mechanism capable of selectively connecting the generator motor to an input side and an output side of the forward reverse switching mechanism.

In the marine propulsion apparatus of the present invention, in a state where the generator motor is connected to the output side of the forward reverse switching mechanism by the connection switching mechanism, when the forward reverse switching mechanism is neutral, the propeller may be driven by power of the generator motor, or the generator motor may be operated as a generator by an idle force of the propeller due to a tidal current.

In addition, in the marine propulsion apparatus of the present invention, in a state where the generator motor is connected to the input side of the forward reverse switching mechanism by the connection switching mechanism, when power of the internal combustion engine is transmitted to the propeller via the forward reverse switching mechanism, the generator motor may assist the internal combustion engine, and when the forward reverse switching mechanism is neutral, the generator motor may be operated as a generator by power of the internal combustion engine.

Moreover, in the marine propulsion apparatus of the present invention, the connection switching mechanism may include a first gear train and a second gear train, and their respective input gears may be configured to be alternatively engaged with and disengaged from the generator motor. The forward reverse switching mechanism may include an input shaft coupled to the internal combustion engine, a forward clutch on the input shaft, a forward rotation output gear that transmits the power of the internal combustion engine to a reduction output gear on a propeller side by an engagement of the forward clutch, a reverse rotation shaft parallel to the input shaft, a transmission gear pair that couples the reverse rotation shaft and the input shaft, a reverse clutch on the reverse rotation shaft, and a reverse rotation output gear that transmits the power of the internal combustion engine to the reduction output gear by an engagement of the reverse clutch. Here, the input side may be the transmission gear pair, and the output side may be the forward rotation output gear and the reverse rotation output gear. An output gear of the first gear train may be meshed with the forward rotation output gear or the reverse rotation output gear, and an output gear of a second gear train may be set to have a specification of meshing with one of the transmission gear pair and a specification of meshing with an other of the transmission gear pair.

Further, a reduction ratio of the first gear train may be set to be larger than a reduction ratio of the second gear train.

In addition, in the marine propulsion apparatus of the present invention, a housing that houses the forward reverse switching mechanism and the connection switching mechanism may be formed by connecting a first cover body in which the internal combustion engine is installed, an intermediate case body, and a second cover body in which the generator motor is installed, and the inside of the housing may be formed with a first chamber surrounded by the first cover body and the intermediate case body, and a second chamber surrounded by the intermediate case body and the second cover body. The first chamber may house the forward reverse switching mechanism and the connection switching mechanism, while the second chamber may house a transmission mechanism that couples the generator motor and the connection switching mechanism in such a manner that power can be transmitted.

Further, an operation unit of the connection switching mechanism may be disposed in an upper part of the first chamber of the housing, an actuator that switches and actuates the operation unit may be disposed on a side of the generator motor, and an operation system that couples both may be provided on an upper surface side of the housing.

Furthermore, in the marine propulsion apparatus of the present invention, the connection switching mechanism may include a first switching gear and a second switching gear, and those gears may be configured to be alternatively engaged with and disengaged from the generator motor. The forward reverse switching mechanism may include an input shaft coupled to the internal combustion engine, a forward clutch on the input shaft, a forward rotation output gear that transmits the power of the internal combustion engine to a reduction output gear on a propeller side by an engagement of the forward clutch, a reverse rotation shaft parallel to the input shaft, a transmission gear pair that couples the reverse rotation shaft and the input shaft, a reverse clutch on the reverse rotation shaft, and a reverse rotation output gear that transmits the power of the internal combustion engine to the reduction output gear by an engagement of the reverse clutch. Here, the input side may be the transmission gear pair, and the output side may be the forward rotation output gear and the reverse rotation output gear. The forward rotation output gear and the reduction output gear may be a conical gear pair, and an output shaft to which the reduction output gear is fixed may be tilted with respect to the input shaft. The first switching gear may be engaged with the forward rotation output gear, as a reverse conical gear, and the second switching gear may be engaged with one or an other of the transmission gear pair.

Effect of the Invention

According to the present invention, a connection switching mechanism capable of selectively connecting the generator motor to the input side and the output side of the forward reverse switching mechanism is included, and the switching mechanism is interposed between the generator motor and the forward reverse switching mechanism. Thus, a large torque from the ICE internal combustion engine is not directly transmitted to the connection switching mechanism. Therefore, it is not necessary to make the connection switching mechanism to have a large capacity that can withstand a large torque, and the connection switching mechanism can be miniaturized. As a result, the marine propulsion apparatus per se can be downsized and costs can be reduced.

BRIEF DESCRIPTION OF THE DRAWINGS

FIG. 8A to FIG. 8C are diagrams illustrating a marine propulsion apparatus of the present invention applied to a two-unit two-shaft type that is a second embodiment, and FIG. 1A is a port side specification, FIG. 1B is a starboard side specification, and FIG. 1C is a rear view of a ship;

FIG. 10A to FIG. 10C are diagrams illustrating, as a comparative example, a case where a common marine propulsion apparatus is used in a two-unit two-shaft type, and FIG. 10A and FIG. 10B are common specifications for both port and starboard, and FIG. 10C is a rear view of a ship;

DESCRIPTION OF EMBODIMENTS

Figure 1A:
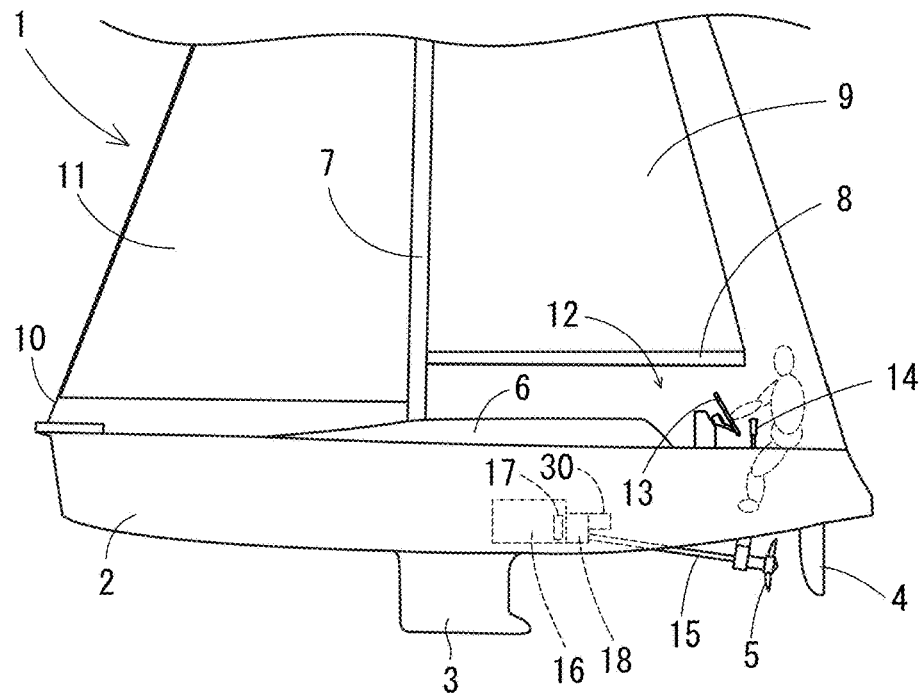
FIG. 1A is a side view of a yacht equipped with a marine propulsion apparatus of the present invention in a first embodiment.

Hereinafter, embodiments embodying a marine propulsion apparatus of the present invention will be described with reference to the drawings. FIG. 1 illustrates a yacht 1, which can be navigated using power, as an example of a ship equipped with a marine propulsion apparatus of the present invention. The yacht 1 has a hull 2, a ballast keel 3 provided at the center of the bottom of the hull 2, a rudder 4 installed at the aft side of the bottom of the hull 2, and a propeller 5 disposed between the ballast keel 3 and the rudder 4. A mast 7 is erected on an upper deck 6 on the upper surface side of the hull 2. A boom 8 is provided at the lower part of the mast 7. A main sail 9 is stretched between the mast 7 and the boom 8. A wire rope 10 is connected to the bow side of the hull 2 and the upper end side of the mast 7. A jib sail 11 is stretched on the wire rope 10.

A steering section 12 is located behind the mast 7. In the steering section 12, a steering wheel 13 that changes the traveling direction of the hull 2 to the right or left by steering, and a control lever 14 that changes and operates the forward movement, stop, backward movement and navigation speed of the hull 2 are provided. A propulsion shaft 15 that rotates the propeller 5 is titled and supported on the aft side of the bottom of the hull 2. The propeller 5 is attached to the protruding end side of the propulsion shaft 15.

Inside the hull 2, an internal combustion engine (hereinafter, ICE) 16 that is the drive source of the propeller 5, a generator motor (hereinafter, GM) 30, and a marine propulsion apparatus 18 that transmits the rotational power of the ICE 16 and/or the GM 30 to the propeller 5 via the propulsion shaft 15 are provided.

FIG. 1A and FIG. 2 to FIG. 7 illustrate a marine propulsion apparatus 18 of a first embodiment. As illustrated FIG. 3, a housing 19 of the marine propulsion apparatus 18 includes a first cover body 20a, an intermediate case body 20b, and a second cover body 20c. The intermediate case body 20b is in the form of substantially a box in which the side with the ICE 16 is open. The opening of the intermediate case body 20b is detachably blocked by the first cover body 20a. On the side of the intermediate case body 20b, the second cover body 20c is detachably attached to the side opposite to the ICE 16. Therefore, in the housing 19, a first chamber 19a surrounded by the first cover body 20a and the intermediate case body 20b, and a second chamber 19b surrounded by the intermediate case body 20b and the second cover body 20c are formed.

The marine propulsion apparatus 18 includes an input shaft 21 coupled to a flywheel 17 of the ICE 16, an output shaft 22 coupled to the propulsion shaft 15, a forward clutch 23 capable of transmitting power in the forward rotation (forward movement) direction from the input shaft 21 to the output shaft 22, and a reverse clutch 24 capable of transmitting power in the reverse rotation (backward movement) direction from the input shaft 21 to the output shaft 22.

The input shaft 21 protrudes from the first chamber 19a of the housing 19 to the ICE 16 side via the first cover body 20a. The output shaft 22 protrudes from the first chamber 19a of the housing 19 toward the propeller 5 side from the intermediate case body 20b. The input shaft 21 is rotatably supported by the first cover body 20a and the intermediate case body 20b in a horizontal state. Similarly to the input shaft 21, the output shaft 22 is also rotatably supported by the first cover body 20a and the intermediate case body 20b, but is titled.

The forward clutch 23 and the reverse clutch 24 are housed in the first chamber 19a of the housing 19. The forward clutch 23 and the reverse-clutch 24 constitute a forward reverse switching mechanism 25. The forward clutch 23 and the reverse clutch 24 are wet type multi-disc hydraulic friction clutches.

The forward clutch 23 is disposed on the input shaft 21. A forward rotation output gear 23b is provided on the downstream side (clutch output side) of power transmission from the ICE 16 in the forward clutch 23. The forward rotation output gear 23b is rotatably and freely installed on the input shaft 21. A transmission gear 23a is formed on the upstream side (clutch input side) of power transmission from the ICE 16 in the forward clutch 23. The transmission gear 23a is fixed to the input shaft 21. When the forward clutch 23 is engaged, the forward rotation output gear 23b rotates integrally with the input shaft 21 and the transmission gear 23a.

The reverse-clutch 24 is disposed on a reverse rotation shaft 26 that extends parallel to the input shaft 21. A reverse rotation output gear 24b is provided on the downstream side (clutch output side) of power transmission from the ICE 16 in the reverse clutch 24. The reverse rotation output gear 24b is rotatably and freely installed on the reverse rotation shaft 26. A transmission gear 24a is formed on the upstream side (clutch input side) of power transmission from the ICE 16 in the reverse clutch 24. The transmission gear 24a is fixed to the reverse rotation shaft 26 and is meshed with the transmission gear 23a of the forward clutch 23. When the reverse clutch 24 is engaged, the reverse rotation output gear 24b is integrated with the reverse rotation shaft 26 and the transmission gear 24a, and rotates in the direction opposite to the rotation direction of the input shaft.

The transmission gear 23a of the forward clutch 23 is a cylindrical gear having the same number of teeth and modules as those of the transmission gear 24a of the reverse clutch 24, and is meshed with each other. The forward rotation output gear 23b and the reverse rotation output gear 24b are meshed with a reduction output gear 27 fixed to the output shaft 22. The forward rotation output gear 23b, the reverse rotation output gear 24b, and the reduction output gear 27 constitute a reduction gear mechanism having a fixed reduction ratio. The power from the ICE 16 is reduced to this fixed reduction ratio to rotate the output shaft 22.

Figure 1B:
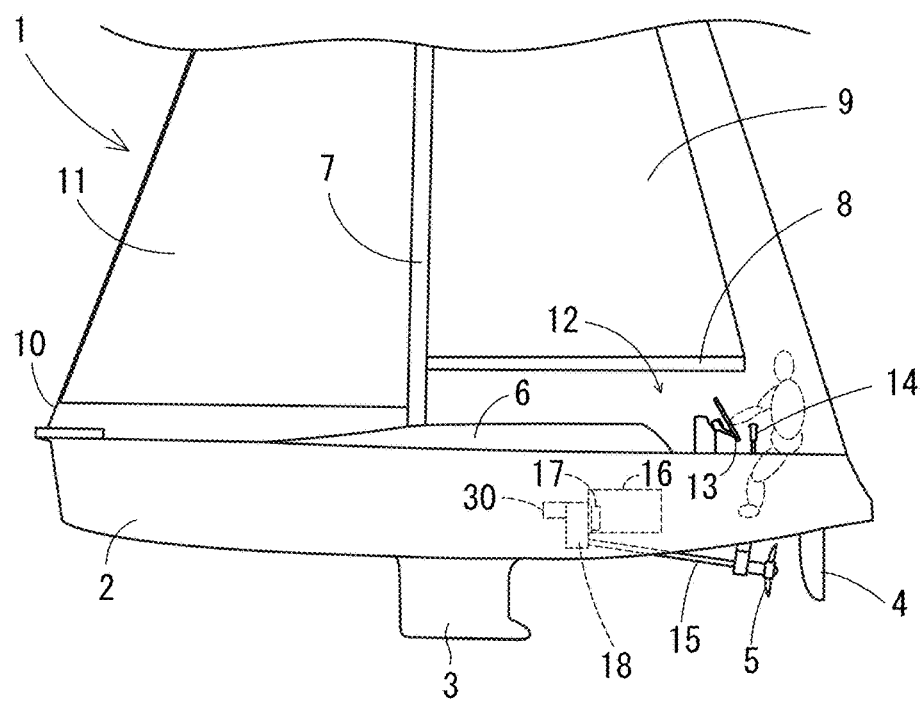
FIG. 1B is a side view of a yacht equipped with a variation of the marine propulsion apparatus of the present invention.

Here, as a method for making the cabin larger and the engine chamber smaller, the marine propulsion apparatus of the present embodiment employs a so-called "angle drive" in which the output shaft 22 is tilted to enable horizontal installation of the ICE 16. As an example, by using a conical gear pair for the forward rotation output gear 23b and the reduction output gear 27, it is possible to transmit power while tilting the output shaft 22 with respect to the input shaft 21. The reverse rotation output gear 24b is in mesh with the reduction output gear 27 as a cylindrical gear. As illustrated in FIG. 1B, as an alternative to the "angle drive", a so-called "V drive" can also be installed horizontally by pulling the ICE 16 to the stern side.

The end of the reverse rotation shaft 26 extends from the second cover body 20c, and a main hydraulic pump 28 that supplies hydraulic oil to the forward clutch 23 and the reverse clutch 24 is attached. The pump 28 may be attached to the end of the input shaft 21. The main hydraulic pump 28 is configured to be driven by being powered by the ICE 16 and the GM 30. The main hydraulic pump 28 is attached to the second cover body 20c side. Various valves for a hydraulic clutch, a supply oil passage, and a cooling lubricating oil passage, which will be described below and to which oil is supplied from the main hydraulic pump 28, are provided in the second cover body 20c.

By supplying hydraulic pressure and alternatively pressing the friction plates of the clutches 23 and 24, the input shaft 21 and the output shaft 22 are coupled in such a manner that power can be transmitted. In other words, if the forward clutch 23 is connected and the reverse clutch 24 is disengaged, the power of the input shaft 21 is transmitted to the output shaft 22 as the power in the forward rotation (forward movement in the traveling direction of the ship) direction, which is the forward movement state. Conversely, if the forward clutch 23 is disengaged and the reverse clutch 24 is connected, the power of the input shaft 21 is transmitted to the output shaft 22 as the power in the reverse rotation (backward movement) direction, which is the backward movement state. If the hydraulic oil is discharged from the forward clutch 23 and the reverse clutch 24 at the same time as the supply of the hydraulic pressure is stopped, the power of the input shaft 21 is not transmitted to the output shaft 22, which is the neutral state.

The GM 30 functioning as a generator and an electric motor is attached to the upper outer side of the second cover body 20c in the housing 19. A reference numeral 20d is its attachment base, which is installed on the second cover body 20c. The GM 30 is configured to be able to transmit power to the input side and the output side of the forward reverse switching mechanism 25 via a connection switching mechanism 37. The GM 30 is connected to a power supply device 98 (which can also be called a battery) that can be charged and discharged via an inverter 29 (see FIG. 15). The GM 30 is driven as an electric motor by the electric power of the power supply device 98 including a secondary battery or a large-capacity capacitor, and meanwhile is configured to generate electric power by operating as a generator on the basis of the transmitted power so as to charge the power supply device 98.

In this case, the rotary shaft 31 of the GM 30 extends in parallel with the input shaft 21 and the reverse rotation shaft 26, and is inserted into the second chamber 19b of the housing 19. A rotary gear 32 is fixed to the rotary shaft 31. Further, in the second chamber 19b, an intermediate shaft 33 and a switching shaft 35 extending in parallel with the input shaft 21 and the reverse rotation shaft 26 are disposed.

The intermediate shaft 33 is rotatably supported by the rear surface of the intermediate case body 20b and the second cover body 20c. The switching shaft 35 extends across the first chamber 19a and the second chamber 19b, and is rotatably supported by the first cover body 20a, the intermediate case body 20b, and the second cover body 20c. An intermediate gear pair 34 is fixed to the intermediate shaft 33. The relay gear 36 is fixed to a part in the second chamber 19b of the switching shaft 35. The rotary gear 32 of the rotary shaft 31 is meshed with one of the intermediate gear pair 34, and the other of the intermediate gear pair 34 is meshed with the relay gear 36 on the switching shaft 35. The rotary gear 32 of the rotary shaft 31 in the GM 30, the intermediate gear pair 34 of the intermediate shaft 33, and the relay gear 36 of the switching shaft 35 constitute a transmission gear train 45 that couples the GM 30 and the connection switching mechanism 37 in such a manner that power can be transmitted. In other words, the rotary gear 32 of the rotary shaft 31 in the GM 30, the intermediate gear pair 34 of the intermediate shaft 33, and the relay gear 36 of the switching shaft 35 are housed in the second chamber 19b.

Figure 2:
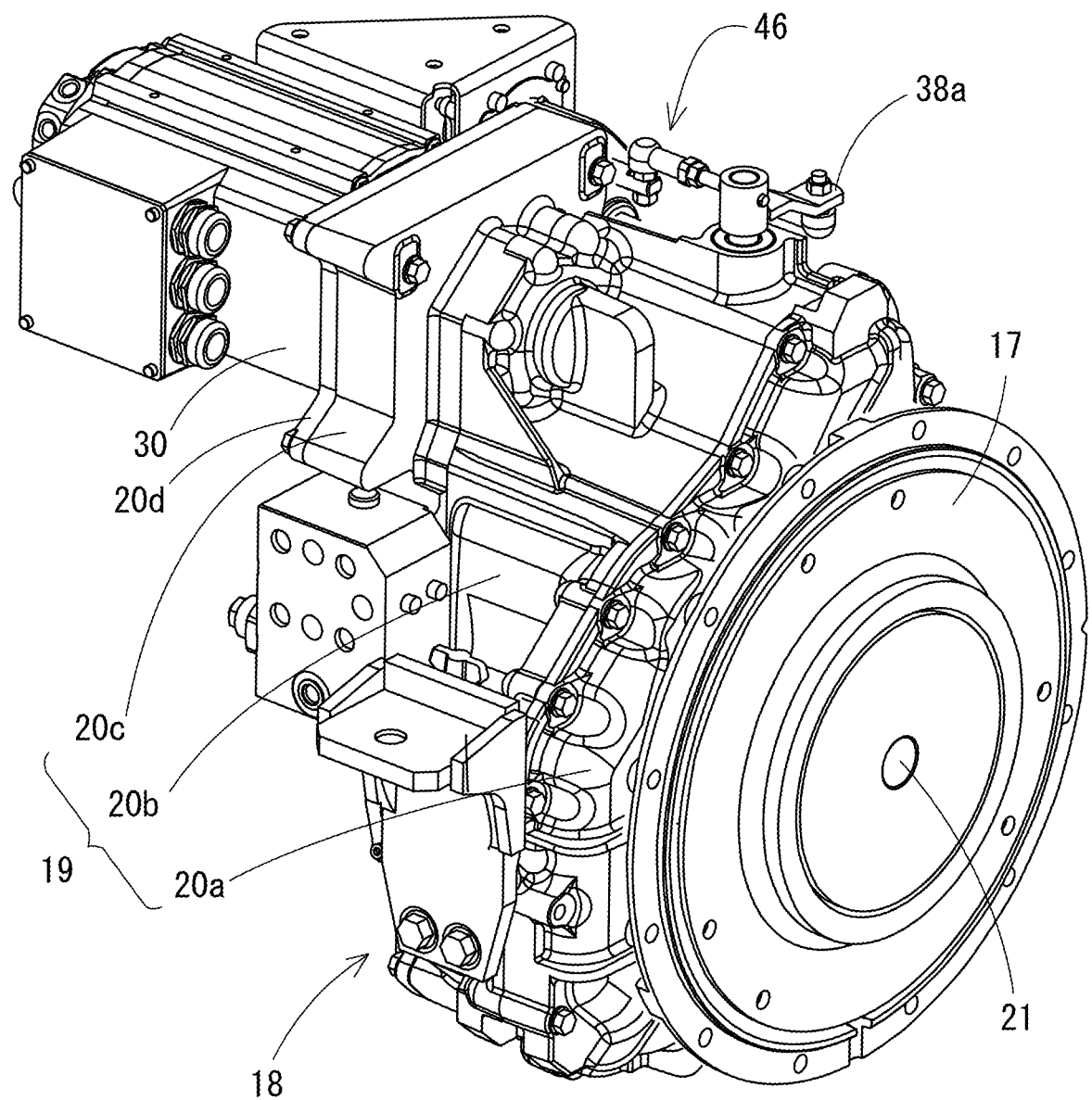
FIG. 2 is a perspective view illustrating the appearance of the marine propulsion apparatus.
Figure 4:
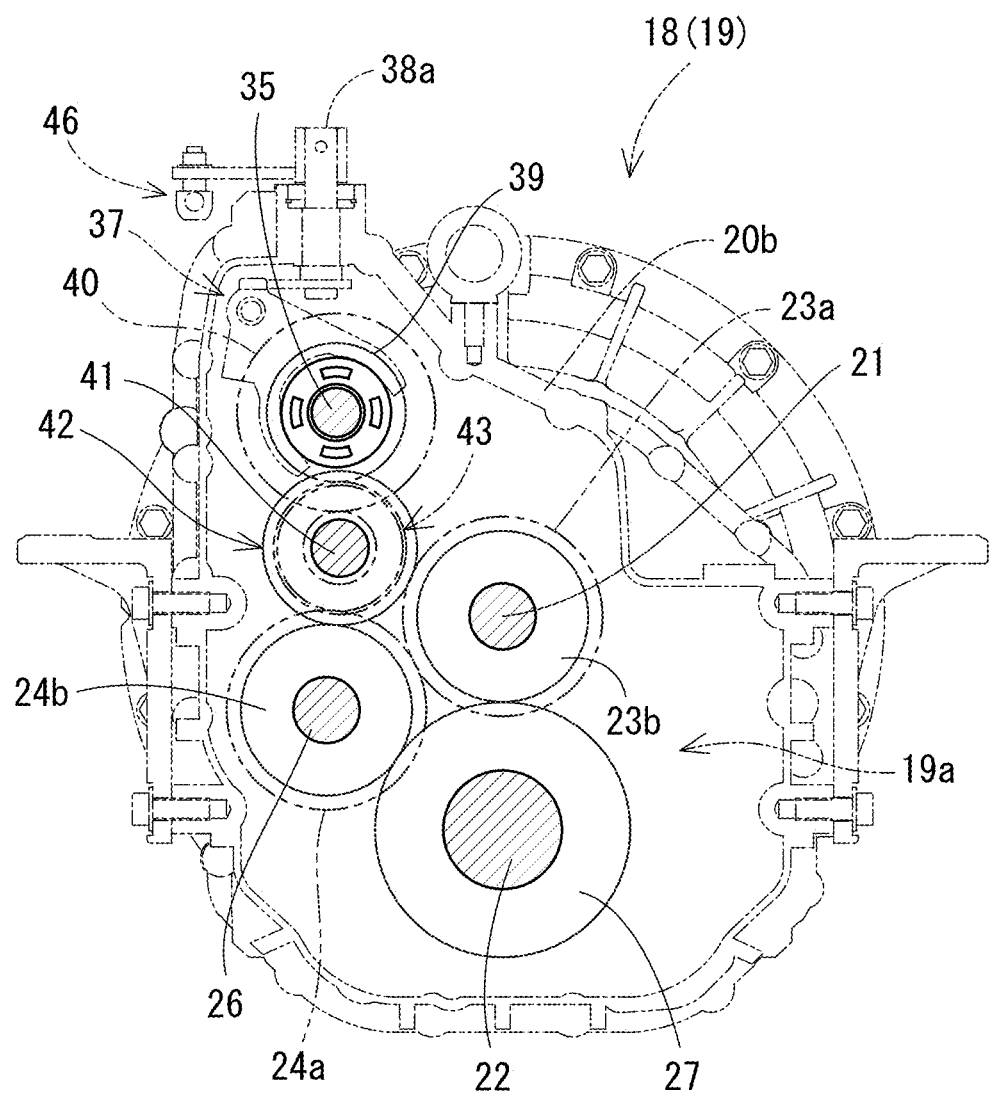
FIG. 4 is a schematic illustration of the arrangement relation of a gear train in the marine propulsion apparatus.
Figure 5:
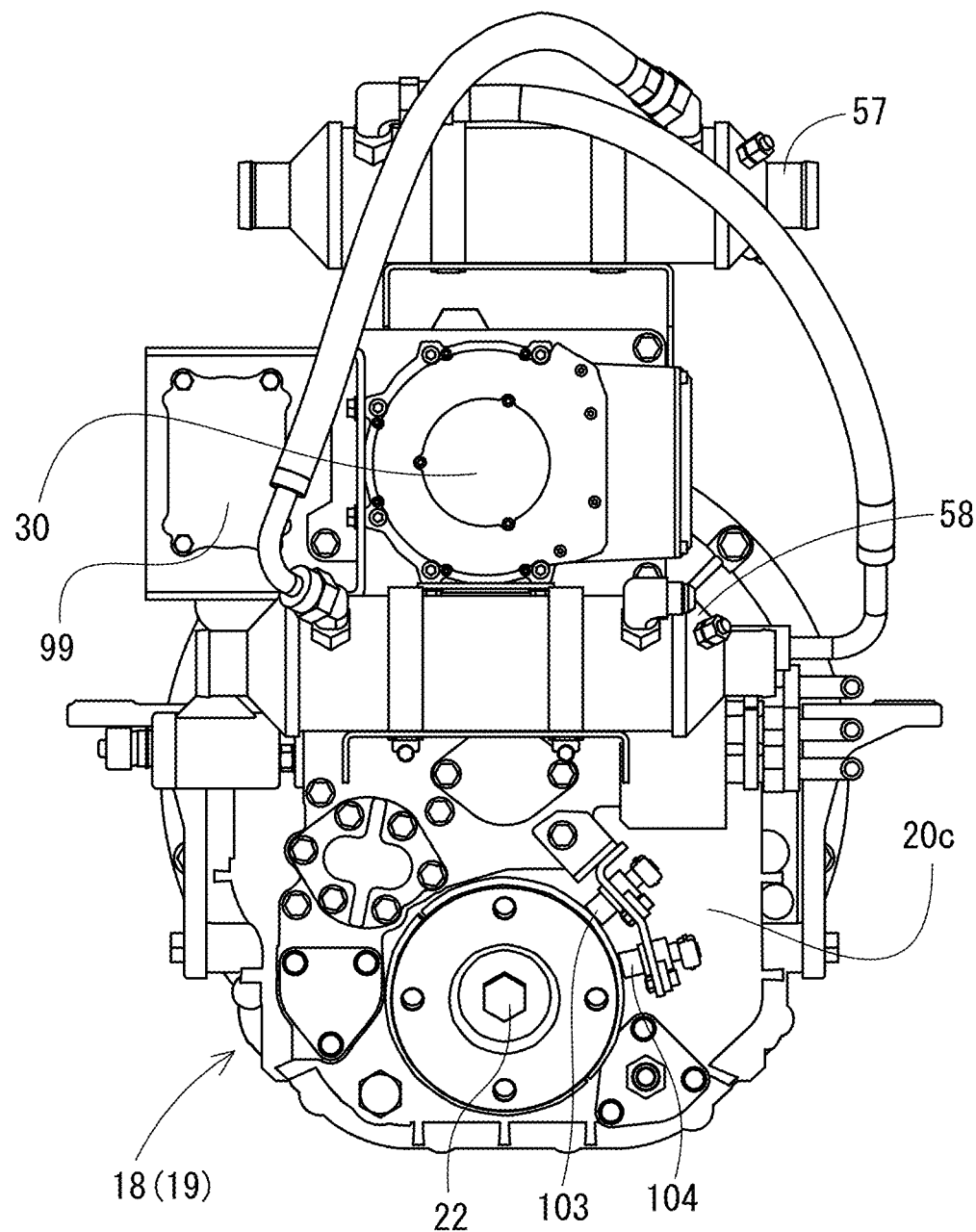
FIG. 5 is a rear view illustrating the appearance of the marine propulsion apparatus.
Figure 6:
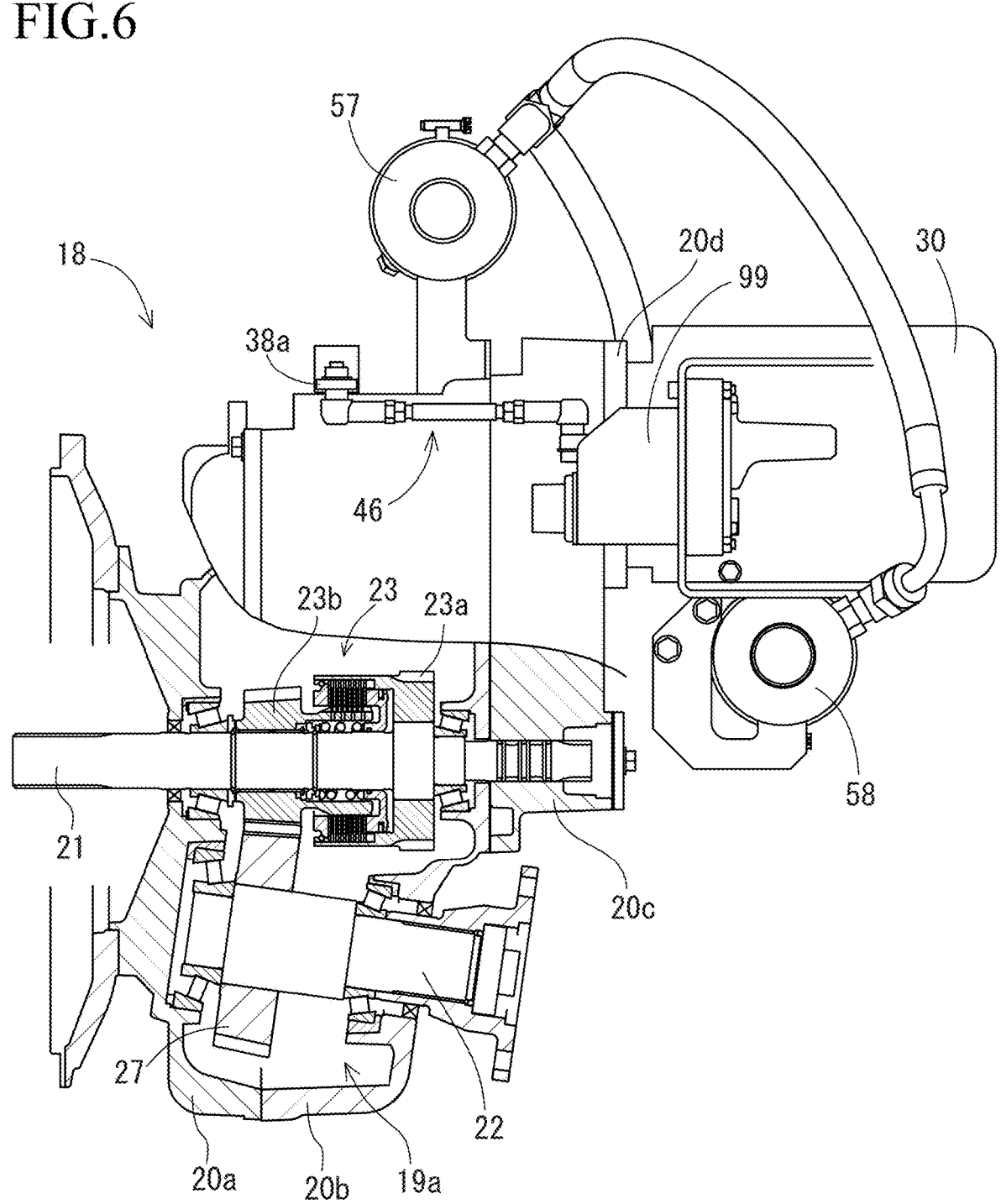
FIG. 6 is a partial cutout side view of the marine propulsion apparatus.
Figure 7:
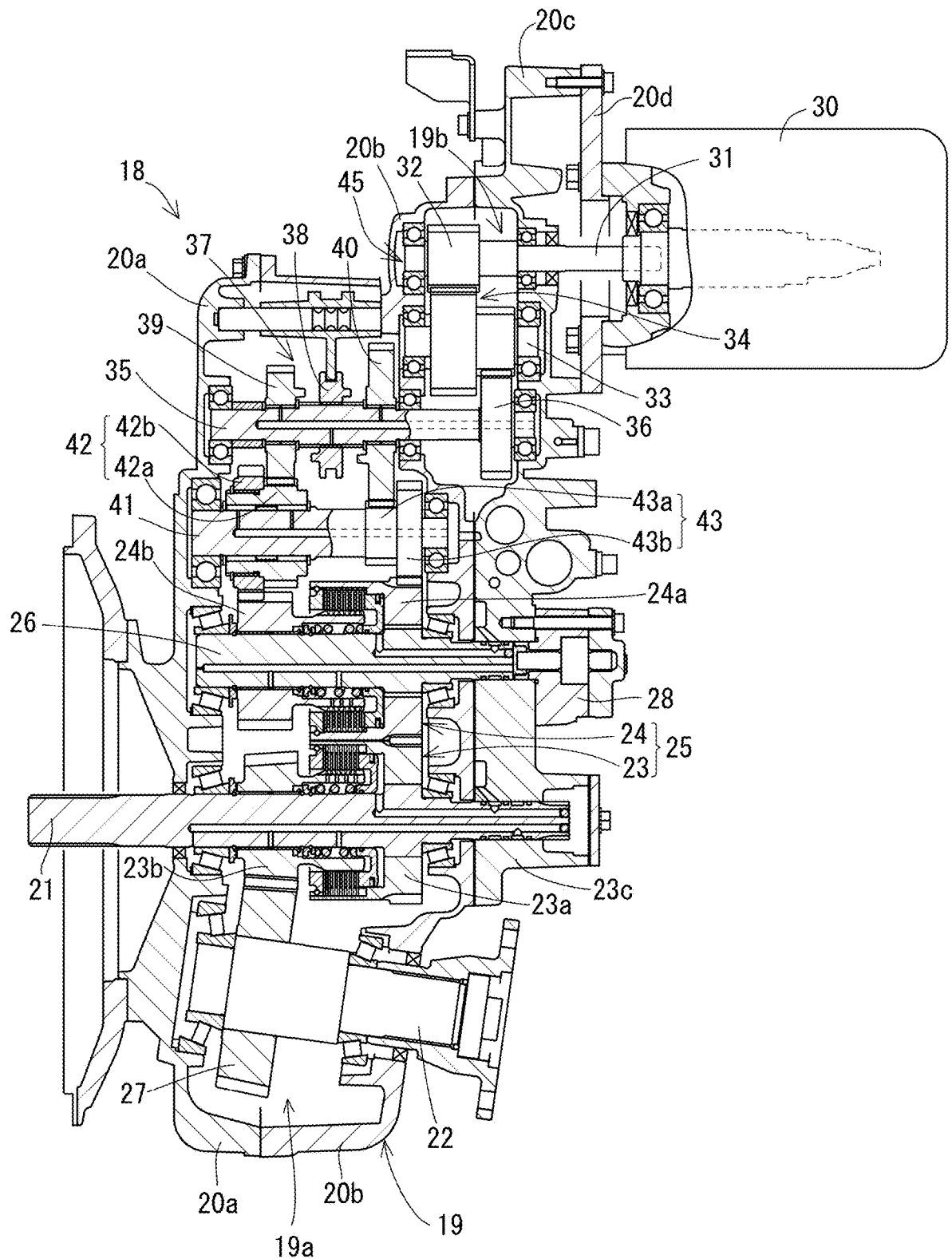
FIG. 7 is a cross-section in side view of the marine propulsion apparatus.

As illustrated in FIG. 2, FIG. 4, and FIG. 5, the upper half of the housing 19 (intermediate case body 20b) is formed in an upward narrowing shape because the forward reverse switching mechanism 25, the reduction output gear 27, and the like are accommodated in the lower half. The upper narrowing shape makes it easy to install the intake/exhaust system (intake pipe, exhaust pipe, etc.) of the ICE 16 coupled to the marine propulsion apparatus 18 without interference. In addition, as illustrated in FIG. 5 and FIG. 6, in the marine propulsion apparatus 18, oil coolers 57 and 58 are supported.

The connection switching mechanism 37 is disposed at a part in the first chamber 19a of the switching shaft 35. The connection switching mechanism 37 is positioned in the upper part of the first chamber 19a of the housing 19. The connection switching mechanism 37 is configured to be able to selectively connect or disconnect the GM 30 to the input side and the output side of the power transmission from the ICE 16 in the forward reverse switching mechanism 25. The connection switching mechanism 37 includes a first switching gear 39 and a second switching gear 40 that can be connected to and disconnected from the switching shaft 35 by the switching operation of a clutch shifter 38. The clutch shifter 38 is fitted to the switching shaft 35 so as not to rotate relative to the switching shaft 35 and so as to slide in the axial direction. The first switching gear 39 and the second switching gear 40 are fitted to the switching shaft 35 so as to rotate relative to the switching shaft 35. The reduction ratio of the second gear train (gears 40, 43a, and 43b, which will be described below) configured with the second switching gear 40 as the base point may be different from or the same as the reduction ratio of the first gear train (gears 39, 42a, and 42b, which will be described below) configured with the first switching gear 39 as the base point. If the reduction ratio is to be the same, it is desirable to use a GM 30 that can output high torque when functioning as an electric motor. Conversely, if the reduction ratio of the first gear train is set to be larger than that of the second gear train, a GM 30 with high rotation and low torque specifications can be employed, and thus it is possible to reduce the size and cost.

A counter shaft 41 is positioned in the first chamber 19a and is supported by the first cover body 20a and the intermediate case body 20b. A first transmission gear pair 42 constituting the first gear train and a second transmission gear pair 43 constituting the second gear train are fitted to the counter shaft 41 so as to be relatively rotatable. The first switching gear 39 of the connection switching mechanism 37 is meshed with one of the first transmission gear pair 42 (first transmission input gear 42a), and the reverse rotation output gear 24b on the power transmission output side of the forward reverse switching mechanism 25 is meshed with the other of the first transmission gear pair 42 (first transmission output gear 42b). The second switching gear 40 of the connection switching mechanism 37 is meshed with one of the second transmission gear pair 43 (second transmission input gear 43a), and the transmission gear 24a on the power transmission input side of the forward reverse switching mechanism 25 is meshed with the other of the second transmission gear pair 43 (second transmission output gear 43b).

A reference numeral 99 is a push-pull type clutch actuator with three selectable positions, and is installed on one side of the GM 30 with its actuation direction along the axial center of the input shaft 21. The clutch shifter 38 can take, by the actuation of the clutch actuator 99, the position of selectively engaging with either the first switching gear 39 or the second switching gear 40, or the position of not engaging with either. The clutch actuator 99 is configured to switch the clutch shifter 38 in accordance with the navigation speed (rotation speed of the propeller 5). The clutch actuator 99 can be electrically control, for example, using a linear solenoid, or an electric pump combined with a hydraulic or pneumatic piston. As illustrated in FIG. 2 and FIG. 4, an operation arm 38a of the clutch shifter 38 is disposed on the upper surface of the housing 19 (intermediate case body 20b), and an operation system 46 that couples the operation arm 38a and the clutch actuator 99 is provided on the upper surface side of the housing 19 (intermediate case body 20b). This allows the clutch actuator 99 to be mounted on the upper part of the housing 19, where there is relatively more space around it, and in addition, the wiring or the like for the clutch actuator 99 can be easily routed.

In a first connection state where the first switching gear 39 is engaged with the clutch shifter 38, the switching shaft 35 and the first switching gear 39 rotate integrally, and thus the GM 30 transmits power to the output shaft 22 via the first gear train. In a second connection state where the second switching gear 40 is engaged with the clutch shifter 38, the switching shaft 35 and the second switching gear 40 rotate integrally, and thus the GM 30 transmits power to the input shaft 21 via the second gear train. In a disengaged state where the clutch shifter 38 does not engage with either of the switching gears 39 and 40, power cannot be transmitted between the GM 30 and the output shaft 22 or the input shaft 21 (the state becomes neutral).

In such a configuration, the marine propulsion apparatus of the present embodiment can obtain various modes as follows by operating a mode change switch 107 and the control lever 14 which will be described below.

1. <ICE Navigation Mode>

When an ICE navigation mode is selected by a mode change switch 107, the yacht 1 can be started from a moored state by the power of the ICE 16 by operating the control lever 14 instead of sailing, and can navigate at full throttle. Tilting the control lever 14 in accordance with the desired traveling direction will connect the forward clutch 23 or reverse clutch 24. As the operation amount of the control lever 14 increases, the throttle (not illustrated) of the ICE 16 is opened and the output increases. Here, the connection switching mechanism 37 does not engage the clutch shifter 38 with either the first switching gear 39 or the second switching gear 40 by the actuation of the clutch actuator 99. By controlling the hydraulic pressure supplied to the friction multi-plate of the forward clutch 23 or the reverse clutch 24 to a low pressure and sip-engaging the clutch, starting and very low speed navigation such as trolling are attained. In the area from starting to very low speed navigation, the GM navigation mode that will be described below can be used, considering the quietness and the degree of wear of the forward clutch 23 or the reverse clutch 24.

2. <ICE Navigation Power Generation Mode>

In navigating with the ICE 16 as the drive source, when the rotation speed of the ICE 16 is at a predetermined value or and the ship navigates at low speed, the connection switching mechanism 37 engages the first switching gear 39 and the clutch shifter 38 by the actuation of the clutch actuator 99. This allows the GM 30 to function as a generator. The surplus of ICE 16 power is transmitted to GM 30 via the first gear train, and the GM 30 generates electric power. The generated power is charged to the power supply device 98.

When the output rotation of the ICE 16 is increased and the ship navigates at a high speed above a predetermined value, if the second switching gear 40 and the clutch shifter 38 are engaged by the actuation of the clutch actuator 99, the second gear train that has a smaller reduction than the first gear train can efficiently continue the function of the GM 30 as a generator. The surplus of ICE 16 power is transmitted to GM 30 via the second gear train, and the GM 30 generates electric power. The generated power is charged to the power supply device 98.

3. <Hybrid Navigation Mode>

During normal navigation on the ICE 16, the GM 30 is switched to function as an electric motor by the electric power of the power supply device 98. When the aforementioned ICE 16 navigates at low speed at a predetermined rotation speed or below, the connection switching mechanism 37 transmits the power of the GM 30 to the reduction output gear 27 via the intermediate gear pair 34, the relay gear 36, and the first gear train, and the shortage of the ICE 16 power is supplemented by the power of the GM 30. When the aforementioned ICE 16 navigates at high speed at a predetermined rotation speed or above, the power of the GM 30 is transmitted to the reduction output gear 27 via the intermediate gear pair 34, the relay gear 36, and the second gear train with a smaller reduction ratio, and the shortage of the ICE 16 power is supplemented by the power of the GM 30. The GM 30 can function as an electric motor over the entire rotation of the ICE 16, and the power of the GM 30 as an electric motor can be effectively used to assist the ICE 16 power.

4. <GM Navigation Mode>

When the yacht 1 is started and navigated by the power of GM from a moored state, the forward reverse switching mechanism 25 is set to the neutral state, and the connection switching mechanism 37 engages the first switching gear 39 with the clutch shifter 38 by actuating the clutch actuator 99, and actuates the GM 30 as an electric motor. The power of the GM 30 is transmitted to the reduction output gear 27 from the intermediate gear pair 34 via the first gear train. If the control lever 14 is tilted to the forward movement side, the GM 30 rotates in the forward rotation direction and the output of the GM 30 increases to the maximum as it is operated to the full throttle state, and the power of the GM 30 is transmitted to the propeller 5 to navigate. When moving backward, the rotation direction of the GM 30 is reversed by tilting the control lever 14 to the opposite side.

5. <Sailing Power Generation Mode>

When the yacht 1 sails, the propeller 5 is idling a the tidal current, and its rotation can be used to drive the GM 30. In this case, the forward reverse switching mechanism 25 is set to the neutral state, and the connection switching mechanism 37 engages the first switching gear 39 and the clutch shifter 38 by driving the clutch actuator 99. The idle force of the propeller 5 caused by the tidal current or the like is transmitted to the reverse rotation output gear 24b via the propulsion shaft 15, the output shaft 22, and the reduction output gear 27, and is transmitted to the GM 30 from the reverse rotation output gear 24b via the first gear train, and the GM 30 functions to generate electric power. The generated power is charged to the power supply device 98.

6. <ICE Power Generation Mode>

When the yacht 1 is moored, the power of the ICE 16 can be used to make the GM 30 to generate power. In this case, the forward reverse switching mechanism 25 is set to the neutral state, and the connection switching mechanism 37 engages the second switching gear 40 and the clutch shifter 38 by driving the clutch actuator 99. The power of ICE 16 power is transmitted to the GM 30 from the transmission gears 23a and 24a via the second gear train, and the GM 30 generates electric power. The generated power is charged to the power supply device 98.

Figure 3:
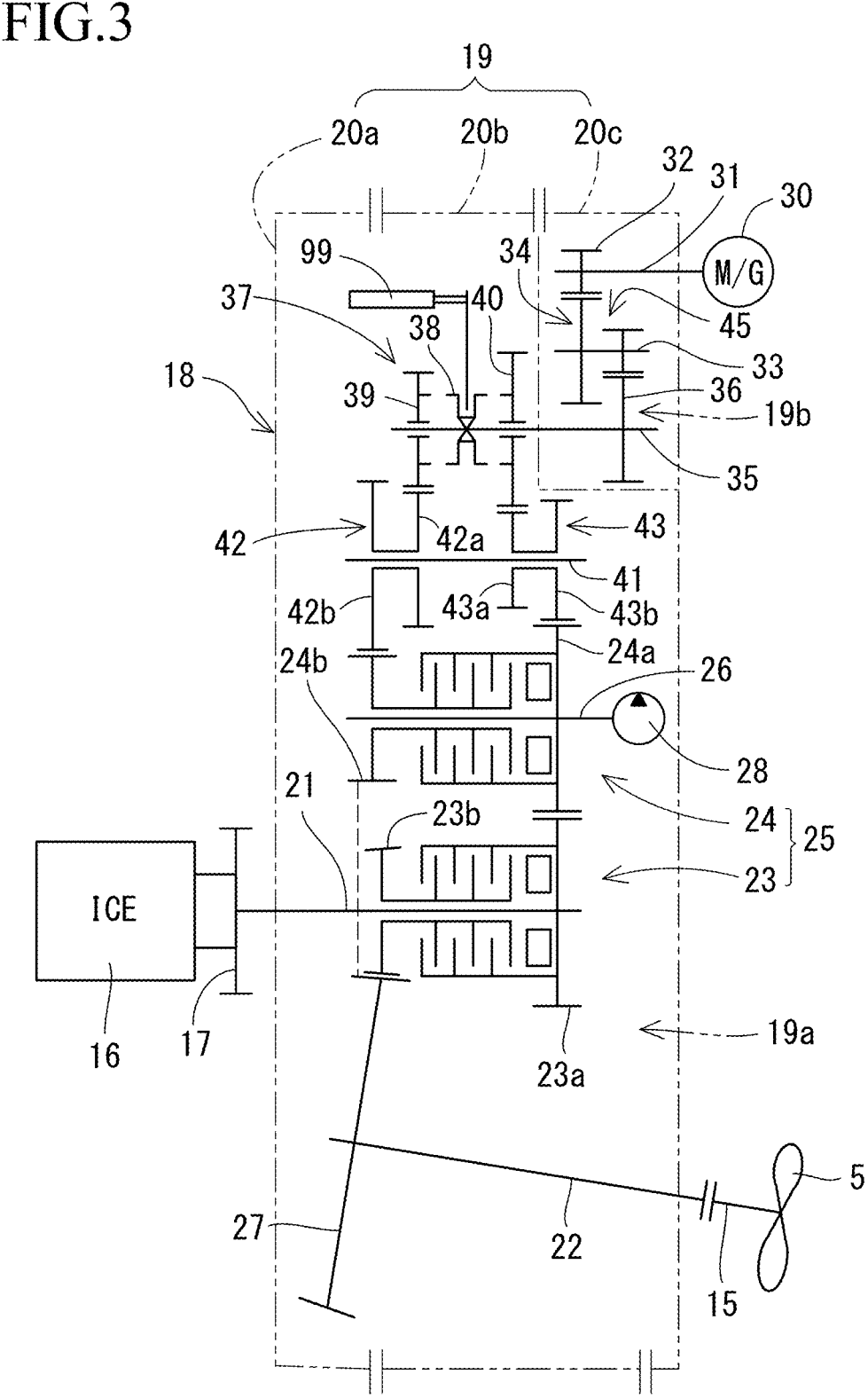
FIG. 3 is a skeleton diagram illustrating a power transmission system of the marine propulsion apparatus.

As is clear from the above description and FIG. 3 and FIG. 4, the marine propulsion apparatus 18 transmits the power of the ICE 16 mounted on the ship 1 to the propeller 5 via the forward reverse switching mechanism 25. Since the connection switching mechanism 37 capable of selectively connecting the GM 30 to the input side and the output side of the forward reverse switching mechanism 25 is provided, a large torque from the ICE 16 is not directly transmitted to the connection switching mechanism 37. Therefore, it is not necessary to make the connection switching mechanism 37 to have a large capacity that can withstand a large torque, and the connection switching mechanism 37 can be miniaturized. As a result, the marine propulsion apparatus 18 per se can be downsized and costs can be reduced.

In addition, in a state where the GM 30 is connected to the output side of the forward reverse switching mechanism 25 by the connection switching mechanism 37, when the forward reverse switching mechanism 25 is neutral, the propeller 5 can be rotated by the power of the GM 30, and the GM 30 can generate power by the idle force of the propeller 5. Thus, for example, when the yacht 1 is started from a still state (navigation is started), the power of the GM 30 can smoothly start navigation without using the power of the ICE 16 and the forward reverse switching mechanism 25. Moreover, the GM 30 can be powered by the idle force of the propeller 5, and a tidal current or the like can be effectively used to charge.

Further, in a state where the GM 30 is connected to the input side of the forward reverse switching mechanism 25 by the connection switching mechanism 37, when the forward reverse switching mechanism 25 is neutral, the GM 30 can generate power by the power of the ICE 16, and thus for example, charging is possible by the power of the ICE 16 when the ship is moored. When the ICE 16 drives the propeller 5 via the forward reverse switching mechanism 25, the GM 30 can assist the ICE 16.

Figure 9:
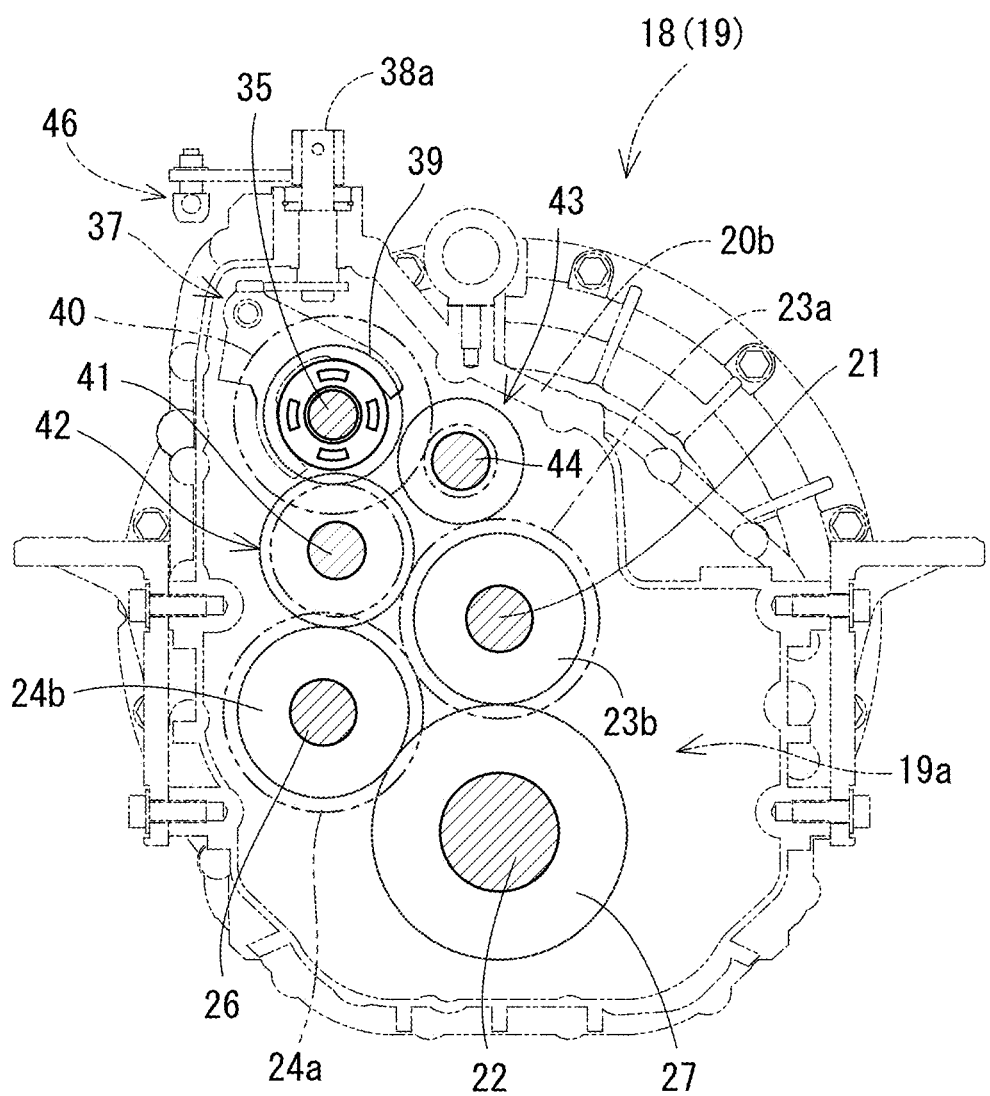
FIG. 9 is a schematic illustration of the arrangement relation of a gear train in the marine propulsion apparatus of the port side specification.

FIG. 8 and FIG. 9 illustrate a second embodiment in which the marine propulsion apparatus 18 of the present invention is employed on a ship 1 of a two-unit two-shaft type. Here, in the second and subsequent embodiments, the configurations and actions that are the same as those of the first embodiment are marked with the same sign as in the first embodiment and their detailed explanations are omitted. Since the ship 1 of the second embodiment is a two-unit two-shaft type, two marine propulsion apparatuses 18 are also installed. In the second embodiment, one marine propulsion apparatus 18 (see FIG. 8B) has the same structure as that of the first embodiment, but the other marine propulsion apparatus 18 (see FIG. 8A and FIG. 9) has a different coupling structure between the connection switching mechanism 37 and the forward reverse switching mechanism 25 from that of the first embodiment.

As illustrated in FIG. 8C and FIG. 10C, in the two-machine two-shaft specification indicated as another example of the ship 1, when navigating with the same ICE 16, it is common that one marine propulsion apparatus 18 engages with the forward clutch 23, and the other engages with the reverse clutch 24 to rotate the adjacent propellers in opposite directions from each other. Here, in FIGS. 8A to 8C and FIGS. 10A to FIG. 10C, "+" indicates a forward rotation and "−" indicates a reverse rotation. As illustrated in FIG. 10A-FIG. 10C, in a case where the two marine propulsion apparatuses 18 have exactly the same structure, when the forward clutch 23 is engaged and navigated by the power of the ICE 16, the rotation directions of the first switching gear 39 and the second switching gear 40 are opposite to each other (see FIG. 10A). In this case, there has been an issue that when switching the clutch shifter 38 to switch to the navigation by the GM 30 (only the electric motor 30 is used or used in combination with the ICE 16), it takes time to synchronize the rotation direction of the switching shaft 35 with respect to the gear to be engaged and complete the switching. In the present invention as a marine propulsion apparatus of a two-machine two-shaft specification, one of the objects is to solve the above issue while sharing the components of the apparatus as much as possible.

Accordingly, as illustrated in FIG. 8A and FIG. 9, in the other marine propulsion apparatus 18, the second transmission gear pair 43 is removed from the counter shaft 41, an additional shaft 44 extending in parallel with the counter shaft 41 is separately provided above the input shaft 21 in the housing 19, and the second transmission gear pair 43 is rotatably supported on the additional shaft 44. The second switching gear 40 of the connection switching mechanism 37 is meshed with one of the second transmission gear pair 43 (second transmission input gear 43*a*), and the transmission gear 24*a* on the input side of the forward reverse switching mechanism 25 is meshed with the other side of the second transmission gear pair 43 (second transmission output gear 43*b*).

That is, both marine propulsion apparatuses 18 and 18 have the same basic structure, but since there are two transmission gears 23*a* and 24*a* on the input side of the forward reverse switching mechanism 25, in one marine propulsion apparatus 18 (FIG. 8A), the GM 30 drives the transmission gear 23*a*, and in the other marine propulsion apparatus 18 (FIG. 8B), the GM 30 drives the transmission gear 24*a*.

With this configuration, as illustrated in FIG. 8A and FIG. 8B, when navigating at low speed in a hybrid navigation mode, in the connection switching mechanisms 37 and 37 of both marine propulsion apparatuses 18 and 18, the rotation direction of the first switching gear 39 driven by the GM 30 is constantly the same as the rotation direction of the second switching gear 40 driven in reverse from the propeller 5 side. Therefore, for example, when shifting to high-speed navigation in the hybrid navigation mode, switching of the clutch shifter 38 can be executed smoothly. A single type of marine propulsion apparatus 18 can be shared on a ship 1 of a two-unit two-shaft type by changing the engaging position of the gears only once, thereby reducing costs.

Figure 11:
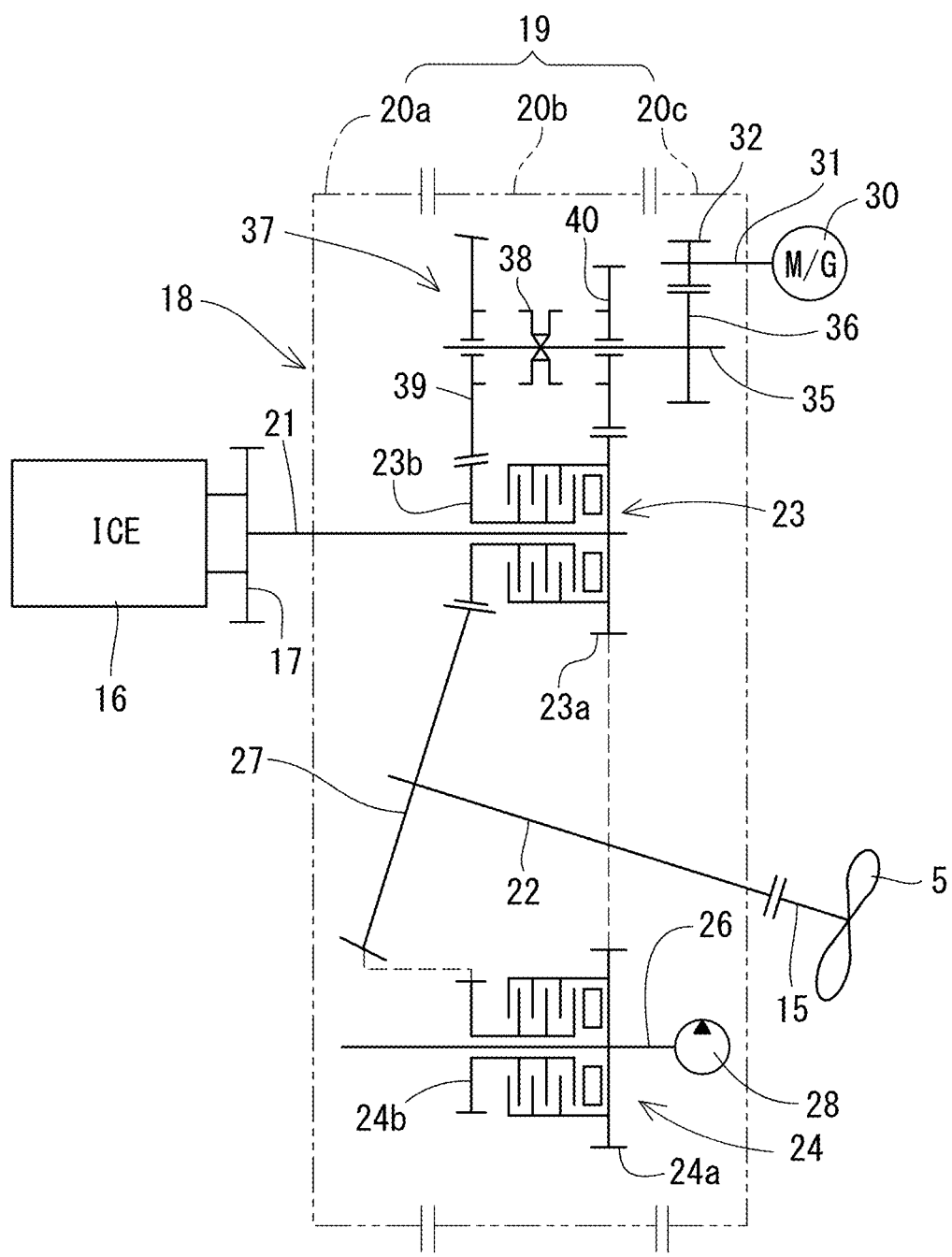
FIG. 11 is a skeleton diagram illustrating a power transmission system of a marine propulsion apparatus in a third embodiment.

FIG. 11 illustrates a third embodiment of the marine propulsion apparatus 18 according to the present invention. In the marine propulsion apparatus 18 of the third embodiment, the power transmission from the rotary shaft 31 to the switching shaft 35 in the GM 30 is composed of a one-stage reduction gear train including a rotary gear 32 and a relay gear 36 that mesh with each other. In addition, the counter shaft 41, the first transmission gear pair 42, and the second transmission gear pair 43 are omitted. The first switching gear 39 is meshed with the forward rotation output gear 23*b* that is the output side of the forward clutch 23, and the second switching gear 40 is meshed with the transmission gear 23*a* that is the input side of the forward clutch 23. In doing so, since the forward rotation output gear 23*b* is a conical gear to configure the angle drive of the propeller 5 as described above, the first switching gear 39 is composed of a conical gear (reverse conical gear) that meshes with the forward rotation output gear 23*b* in a reverse posture. If the marine propulsion apparatus does not require the output shaft 22 to be tilted, the first switching gear 39 and the forward rotation output gear 23*b* can be cylindrical gears.

With this configuration, the power transmission structure related to the intermediate shaft 33 and the counter shaft 41 in the first embodiment can be omitted, and the power transmission structure of the entire marine propulsion apparatus 18 can be simplified, and the marine propulsion apparatus 18 per se can be made compact.

Next, referring to FIG. 12, the hydraulic circuit structure of the marine propulsion apparatus 18 in the first embodiment will be described. A hydraulic circuit 50 of the marine propulsion apparatus 18 includes the main hydraulic pump 28 that supplies oil to the forward clutch 23, the reverse clutch 24, and the like. The main hydraulic pump 28 of the first embodiment is configured to be driven by the rotation of the reverse rotation shaft 26 based on the power of the ICE 16.

The main hydraulic pump 28 is provided on the starting end side of a hydraulic oil passage 51 in which the inner lower part communicates with the housing 19 that functions as an oil tank 19*c*. A strainer 48 is provided on the suction side of the main hydraulic pump 28 in the hydraulic oil passage 51. The ejection side of the main hydraulic pump 28 in the hydraulic oil passage 51 is connected to a forward rotation oil passage 53 toward the forward clutch 23 and a reverse rotation oil passage 54 toward the reverse clutch 24 via a forward reverse solenoid valve 52.

The forward reverse solenoid valve 52 is configured to be switchable among three positions: a forward rotation position where oil is supplied to the forward rotation oil passage 53 as hydraulic oil, a reverse position where oil is supplied to the reverse rotation oil passage 54 as hydraulic oil, and a neutral position where the oil supply as hydraulic oil is stopped and the oil in the forward rotation oil passage 53 and the reverse rotation oil passage 54 is discharged, by exciting or demagnetizing an electro magnetic solenoid linked to the operation of the control lever 14. The switching action of the forward reverse solenoid valve 52 selectively supplies and discharges oil as hydraulic oil to the forward clutch 23 or the reverse clutch 24. In addition, a clutch pressure regulating valve 56 that gradually increases the clutch pressure from zero to the set pressure for the oil in the hydraulic oil passage 51 when the forward reverse solenoid valve 52 is switched from the neutral position to each clutch actuation position is provided.

A cooling lubricating oil passage 55 is provided in the oil tank 19c in parallel with the hydraulic oil passage 51 above. A sub hydraulic pump 77 driven by the power of a cooling/lubrication electric motor 76, which is a drive source different from the ICE 16, is provided on the starting end side of the oil passage 55. A strainer 78 is provided on the suction side of the sub hydraulic pump 77. On the ejection side of the sub hydraulic pump 77, a check valve 79 that opens only in the direction of the cooling lubricating oil passage 55 is provided. The cooling lubricating oil passage 55 is an oil passage for filling, oil in the housing 19, as lubricating oil or cooling oil, for the GM 30, the inverter 29, and a gear group 47 in the housing 19. The gear group 47 is a concept including a friction plate of the forward reverse switching mechanism 25 in the housing 19, the connection switching mechanism 37, various gears, and other lubricated parts such as bearings.

Figure 12:
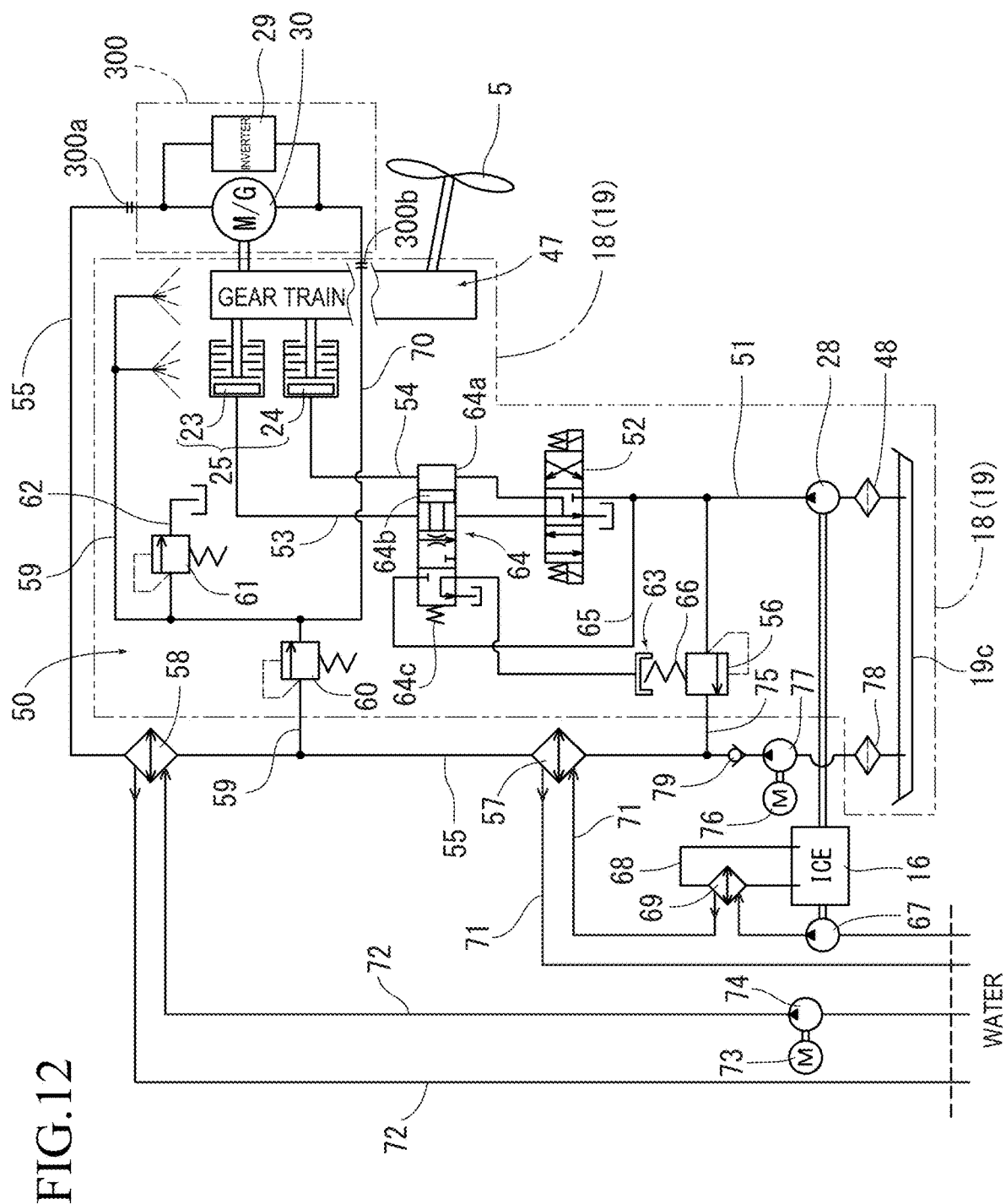
FIG. 12 is a hydraulic circuit diagram (first example) of a marine propulsion apparatus of the present invention.
Figure 13:
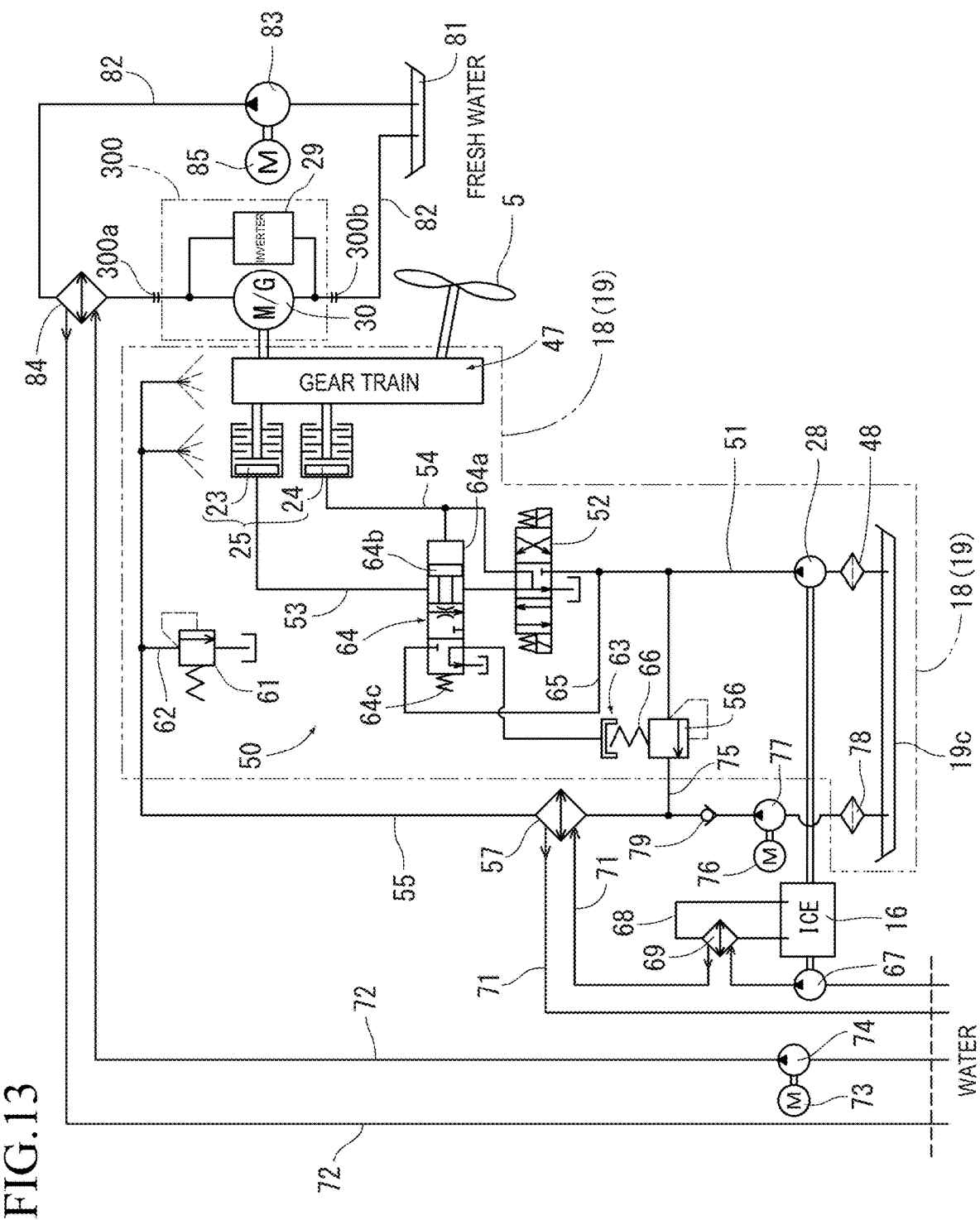
FIG. 13 is also a hydraulic circuit diagram (second example)
Figure 14:
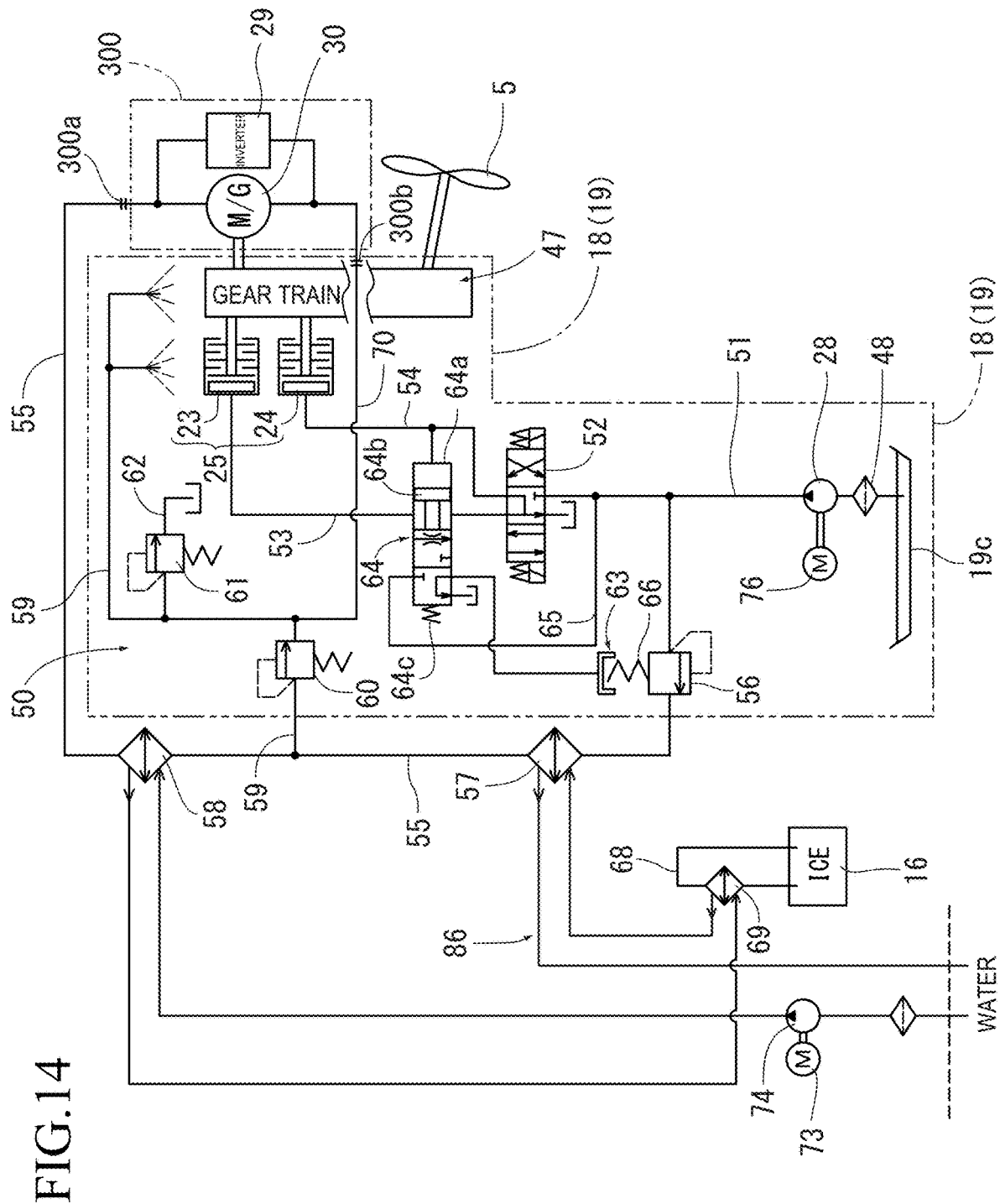
FIG. 14 is also a hydraulic circuit diagram (third example)

As illustrated in FIG. 12 to FIG. 14, the GM 30 and inverter 29 are housed in a common housing 300 and are equipped with refrigerant jackets (not illustrated) for various heating elements. A reference numeral 300a is the refrigerant input port and a reference numeral 300b is the outlet port.

On the secondary side of the check valve 79 in the cooling lubricating oil passage 55, a drain circuit 75 to which the relief oil from the clutch pressure regulating valve 56 is discharged is connected. On the further downstream side, a first oil cooler 57 and a second oil cooler 58, which cool the oil as lubricating oil, are interposed, and the end is connected to the input port 300a of the GM 30 and the inverter 29 associated therewith.

A first distribution oil passage 59 is branched from between the first oil cooler 57 and the second oil cooler 58 in the cooling lubricating oil passage 55, and the end thereof is opened to the portion to be lubricated of the gear group 47. In the first distribution oil passage 59, a first pressure regulating valve 60 that sets the lubricating hydraulic pressure for the portions to be lubricated of the GM 30 and the inverter 29 is disposed. Further, a second pressure regulating valve 61 that sets the lubricating hydraulic pressure for the portion to be lubricated of the gear group 47 is disposed by branching the second distribution oil passage 62 from the first distribution oil passage 59. The oil relieved from the pressure regulating valve 61 is discharged into the housing 19 that is the oil tank 19c.

The oil ejected from the main hydraulic pump 28 driven by the ICE 16 and discharged by the pressure regulating operation of the clutch pressure regulating valve 56 does not flow back to the sub hydraulic pump 77 due to the closing of the check valve 79, and flows to the cooling lubricating oil passage 55, passes through the first oil cooler 57, is regulated by the first pressure regulating valve 60, further passes through the second oil cooler 58 to be cooled, and after cooling the GM 30 and the inverter 29, passes through a drain oil passage 70 connected to the outlet port 300b, and is merged with the secondary side of the first pressure regulating valve 60 of the distribution oil passage 59 and supplied as lubricating oil to the portions to be lubricated of the gear group 47 including the forward reverse switching mechanism 25.

The clutch pressure regulating valve 56 is of a variable relief type, and is provided with a spring-loaded piston 63 that mitigates shock during a forward and reverse clutch connection. In the hydraulic oil passage 51, a pilot oil passage 65 is branched from the primary side of the forward reverse solenoid valve 52 and connected to the spring-loaded piston 63 via a hydraulic switching valve 64.

When the forward reverse solenoid valve 52 switches to the forward rotation or reverse rotation position, oil as hydraulic oil is supplied to the forward rotation or reverse rotation oil passages 53 and 54, and the hydraulic pressure in a cylinder 64a increases, the hydraulic switching valve 64 is switched to the on position via a piston 64b. Then, flow-controlled oil through the pilot oil passage 65 flows into the spring-loaded piston 63 and gradually compresses a relief spring 66, and a set relief pressure of the clutch pressure regulating valve 56 is gradually increased. As a result, the hydraulic pressure between the hydraulic oil passage 51 and the forward rotation or reverse rotation oil passages 53 and 54 gradually increases, and the forward rotation or reverse clutches 23 and 24 gradually become connected.

Then, when the urging force of the relief spring 66 reaches the maximum, the hydraulic pressure between the hydraulic oil passage 51 and the forward rotation or reverse rotation oil passages 53 and 54 is maximized, and the forward rotation or reverse clutches 23 and 24 become completely connected.

If the forward reverse solenoid valve 52 switches to the neutral position and the forward reverse rotation oil passages 53 and 54 are no longer supplied with oil, the hydraulic switching valve 64 is switched to the off position by the urging force of a restoring spring 64c, oil escapes from the spring-loaded piston 63 and the urging force of the relief spring 66 is minimized, the clutch pressure regulating valve 56 functions as an unloading valve, and substantially the entire amount of oil is discharged to the cooling lubricating oil passage 55.

The ICE 16 of the first embodiment includes a first refrigerant pump 67 driven by the power of the ICE 16, in addition to the main hydraulic pump 28. The pump 67 sucks seawater or the like outside the ship and flows it as a refrigerant to an ICE cooling cooler 69 disposed in a lubrication cooling passage 68 of the ICE. The yacht 1 as a ship further includes a first pipe 71 and a second pipe 72 for introducing and discharging the refrigerant to the first oil cooler 57 and the second oil cooler 58, respectively, and a second refrigerant pump 74 driven by the power of an electric motor 73 to allow the refrigerant to flow through the second pipe 72.

The first refrigerant pump 67 is positioned upstream of the first pipe 71 to introduce the refrigerant after cooling the lubricating oil of the ICE 16 to the oil cooler 57. The refrigerant that has passed through the first oil cooler 57 is released overboard from the outlet side of the first pipe 71. The refrigerant such as seawater outside the ship sucked up from the inlet side of the second pipe 72 by the second refrigerant pump 74 is supplied to the second oil cooler 58, and after cooing the oil in the cooling lubricating oil passage 55, the refrigerant is discharged overboard from the outlet side of the second pipe 72.

As is clear from the above description and FIG. 12, in the marine propulsion apparatus 18 that transmits the power of at least one of the ICE 16 and the GM 30 mounted on the ship 1 to the propeller 5 via the forward reverse switching mechanism 25, the main hydraulic pump 28 driven by the power of the ICE 16 as an oil source of the hydraulic oil passage 51 connected to the hydraulic clutch type forward reverse switching mechanism 25 is included. In addition, the clutch pressure regulating valve 56 that regulates the pressure in the hydraulic oil passage 51 to the operating pressure of the hydraulic clutch is provided, while the electric sub hydraulic pump 77 as an oil source for the cooling lubricating oil passage 55 for the GM 30, the forward reverse switching mechanism 25, and the other gear group 47 is provided. The check valve 79 that allows oil inflow only in the direction of the cooling lubricating oil passage 55 is provided on the ejection side of the sub hydraulic pump 77, and the drain circuit 75 of the clutch pressure regulating valve 56 is connected to the secondary side of the check valve 79. Therefore, when the hydraulic clutch is operated and the vehicle is navigated only by the ICE 16, the GM 30 and the forward reverse switching mechanism 25 and the other gear group 47 are lubricated and cooled by the ejected oil of the main hydraulic pump 28, and even when the ICE 16 is stopped and the vehicle is navigated only by the GM 30, it is possible to lubricate and cool the GM 30, the forward reverse switching mechanism 25, and the other gear group 47 by driving the sub hydraulic pump 77.

For example, when the ship 1 is started from a still state (navigation is started) with the power of the GM 30, the navigation can be started smoothly while lubricating the gear group 47. Regardless of the drive state of the ICE 16, insufficient supply of oil as lubricating oil to the gear group 47 can be reliably prevented. When navigating by the power of both ICE 16 and GM 30, each portion to be lubricated can be efficiently lubricated and cooled by a large flow of oil ejected from both pumps 28 and 77. For the GM 30, the forward reverse switching mechanism 25 and the other gear group 47, even if either the pump 28 or 77 fails, the lubrication/cooling state can be maintained, and thus the navigation can be continued safely.

In addition, the oil coolers 57 and 58 are provided in the middle of the cooling lubricating oil passage 55, the portions to be cooled of the GM 30 and the inverter 29 are connected to the end of the cooling lubricating oil passage 55, the portions to be lubricated of the forward reverse switching mechanism 25 and other gear group 47 are connected to the end of the first distribution oil passage 59 branched from between the oil coolers 57 and 58, and the distribution oil passage 59 is provided with the first pressure regulating valve 60 for the portions to be cooled of the GM 30 and the inverter 29. Thus, the low temperature oil that has passed through the oil coolers 57 and 58 can reliably and efficiently cool the GM 30 and the inverter 29. Before supplying oil as lubricating oil to the portions to be lubricated of the forward reverse switching mechanism 25 and the other gear group 47, the GM 30 and inverter 29 can be cooled preferentially, and the heat balance can be maintained well.

The second distribution oil passage 62 is branched between the first pressure regulating valve 60 of the first distribution oil passage 59 and the portions to be lubricated of the forward reverse switching mechanism 25 and other gear groups 47, and the second pressure regulating valve 61 is provided in the second distribution oil passage 62. Thus, the supply of lubricating oil to the gear group 47 can be stabilized.

Further, the first refrigerant pump 67 driven by the power of the ICE 16 is provided in the first pipe 71 that supplies and discharges the refrigerant to the first oil cooler 57, and the electric second refrigerant pump 74 is provided in the second pipe 72 that supplies and discharges the refrigerant to the second oil cooler 58. Thus, even when the ICE 16 is stopped, the oil passing through the second oil cooler 58 by the second refrigerant pump 74 can be cooled to reliably cool the GM 30. Even if the electrical system fails, the cooling function for the lubricating oil can be maintained by the first oil cooler 57.

FIG. 13 illustrates a fourth embodiment that is another example of the hydraulic circuit structure of the first embodiment. In the hydraulic circuit 50 of the fourth embodiment, the second oil cooler 58, the first distribution oil passage 59, and the first pressure regulating valve 60 of the first embodiment are eliminated. The cooling lubricating oil passage 55 supplies lubricating oil only to the portions to be lubricated of the forward reverse switching mechanism 25 and the other gear group 47. The end of the second distribution oil passage 62 branched from the downstream side of the first oil cooler 57 in the cooling lubricating oil passage 55 is communicated with the housing 19, and the second pressure regulating valve 61 is provided in the second distribution oil passage 62.

The yacht 1 as a ship in the fourth embodiment includes a fresh water tank 81 and a cooling pipe 82 that circulates fresh water in the fresh water tank 81. The cooling pipe 82 is provided with a fresh water pump 83 and a fresh water cooler 84. The input port 300a for a refrigerant to the GM 30 and the inverter 29 is connected to the downstream side of the fresh water cooler 84 in the cooling pipe 82. In other words, on the cooling pipe 82 of the fourth embodiment, in order from the upstream side, the fresh water pump 83, the fresh water cooler 84, and the refrigerant jacket (not illustrated) of the GM 30 and the inverter 29 are disposed. The fresh water pump 83 is configured to be driven by the power of an electric motor 85 for fresh water, which is a drive source different from the ICE 16.

The fresh water sucked up from the inlet side of the cooling pipe 82 by the fresh water pump 83 is cooled by the fresh water cooler 84 and then supplied to the refrigerant jacket (not illustrated) of the GM 30 and the inverter 29. The fresh water after cooling the GM 30 and inverter 29 is returned to the fresh water tank 81. The seawater ejected from the second refrigerant pump 74 is used as the refrigerant for the fresh water cooler 84.

As is clear from the above description and FIG. 13, the fresh water tank 81 and the cooling pipe 82 that circulates fresh water in the fresh water tank 81 are included, the fresh water pump 83 and the fresh water cooler 84 are provided in the cooling pipe 82, and the portions to be cooled of the GM 30 and the inverter 29 are connected to the downstream side of the fresh water cooler 84 in the cooling pipe 82. Thus, while the forward reverse switching mechanism 25 and the other gear group 47 are lubricated by the ejected oil of the main hydraulic pump 28 and the sub hydraulic pump 77, the GM 30 and the inverter 29 can reliably cool the GM 30 with low-temperature fresh water that has passed through the fresh water cooler 84. The temperature of the fresh water is not affected by the temperature of the hydraulic oil, and thus the ability to cool the GM 30 and inverter 29 is high, and the heat balance can be maintained even better.

FIG. 14 illustrates a fifth embodiment that is another example of the hydraulic circuit structure of the first embodiment. The hydraulic circuit 50 of the fifth embodiment is different from the first example in that after eliminating the sub hydraulic pump 77 and the check valve 79 of the first embodiment, the drain circuit 75 from which the relief oil from the clutch pressure regulating valve 56 is discharged is connected to the starting end side of the cooling lubricating oil passage 55, and the main hydraulic pump 28 is driven by the cooling/lubrication electric motor 76 instead of the ICE 16. In addition, the first refrigerant pump 67, which is driven by the power of the ICE 16, is eliminated.

In this case, after the seawater ejected from the second refrigerant pump 74 cools the second oil cooler 58, the seawater enters the ICE cooling cooler 69, cools it, then enters the first oil cooler 57, and after cooling it, the seawater is released overboard from a drain pipe 86.

With this configuration, only two pumps, the main hydraulic pump 28 and the second refrigerant pump 74, need to be installed, which contributes to cost reduction. In addition, since a refrigerant such as seawater is supplied to the second oil cooler 58 before the first oil cooler 57, and thus the cooling oil to the GM 30 and inverter 29 can be cooled preferentially, and the heat balance can be well maintained.

Figure 15:
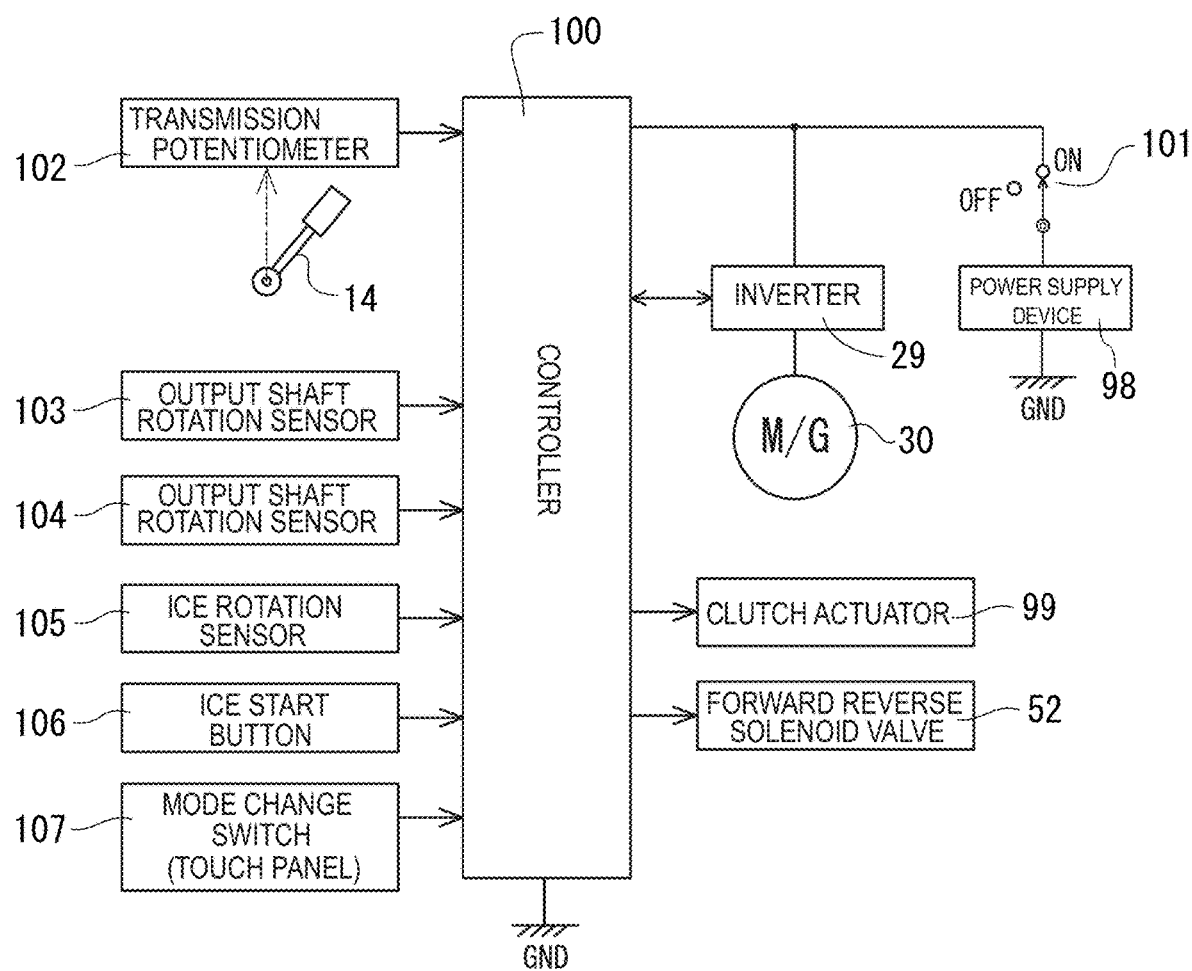
FIG. 15 is a functional block diagram of a controller used in a marine propulsion apparatus of the present invention (first example)
Figure 16:
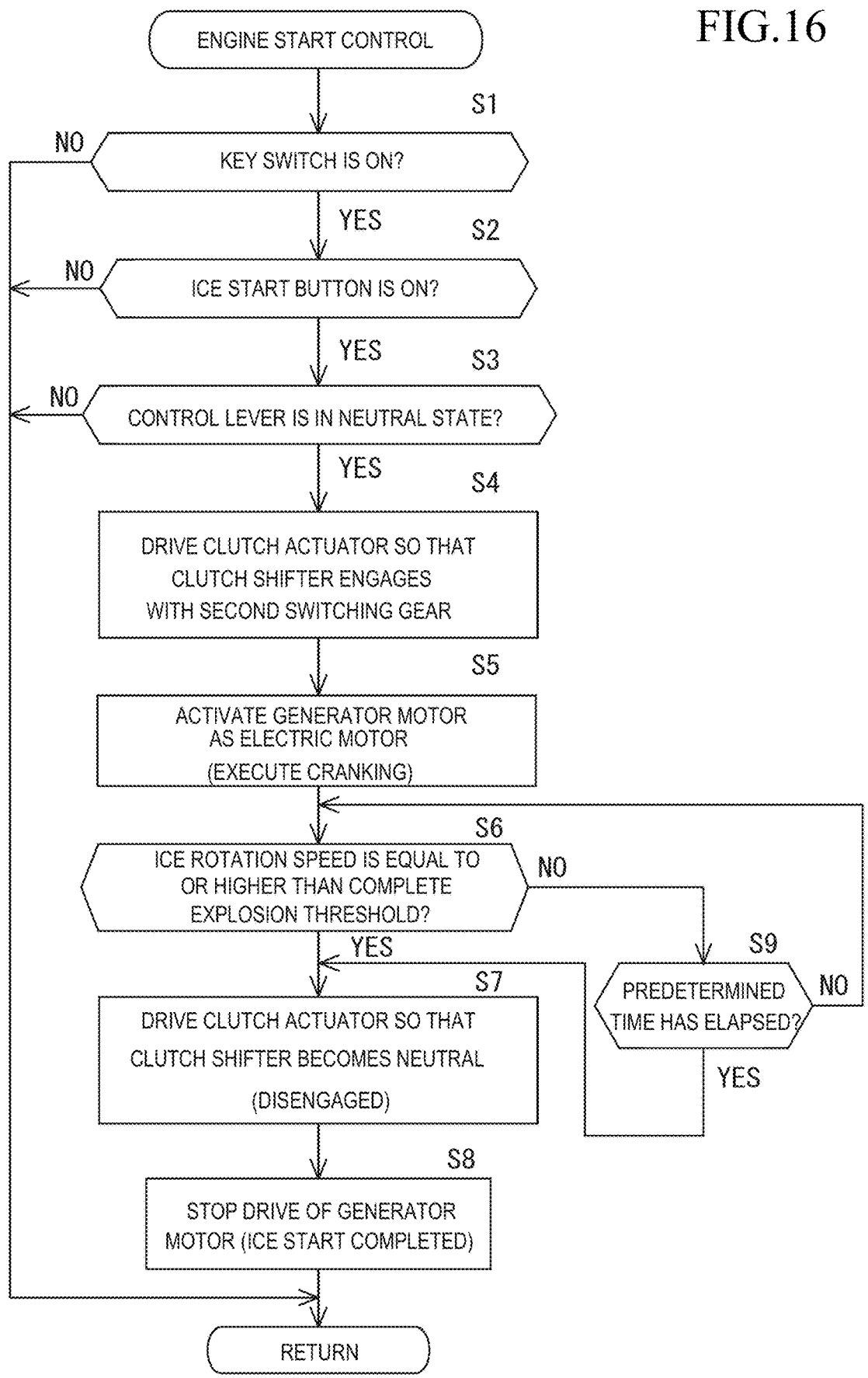
FIG. 16 is a flowchart of the control for starting an ICE in the functional block diagram (first example)

Now, the ICE 16 start control in the first embodiment will be described with reference to FIG. 15 and FIG. 16. As illustrated in FIG. 15, the GM 30 is connected to the power supply device 98 using a rechargeable secondary battery, a large-capacity capacitor, or the like via the inverter 29 having a switching element such as a transistor and a diode.

The inverter 29 supplies electric power from the power supply device 98 to the GM 30 by DC/AC conversion by the ON/OFF operation of the switching element, to actuate the GM as an electric motor (motor). When the GM 30 operates as a generator, the inverter 29 uses a diode bridge to convert the AC to DC, and thereby charges the power from the GM 30 to the power supply device 98. In other words, the GM 30 is configured to reversibly convert mechanical energy from the ICE 16 side to electrical energy from the power supply device 98 side.

The inverter 29 is electrically connected to a controller 100 mounted on the yacht 1 as a ship. The controller 100 mainly controls the overall operation of the ICE 16 and the marine propulsion apparatus 18, and is configured to output a PWM (Pulse Width Modulation) signal to the inverter 29 to turn ON/OFF the switching element in the inverter 29, and thereby cause the GM 30 function as an electric motor (or generator).

As illustrated in FIG. 15, a transmission potentiometer 102 that detects the operating position of the control lever 14, two output shaft rotation sensors 103 and 104 that detect the rotation direction and speed of the output shaft 22 and thus the propeller 5, an ICE rotation sensor 105 that detects the rotation speed of the ICE 16, an ICE start button 106 that starts the ICE 16, the clutch actuator 99, and an electro magnetic solenoid or the like of the forward reverse solenoid valve 52 are electrically connected to the controller 100. The controller 100 is supplied with power from the power supply device 98 via a key switch 101.

Although details are omitted, the controller 100 includes a CPU that executes various arithmetic processings and controls, a ROM for storing control programs and data, a RAM for temporarily storing control programs and data, an input/output interface, and the like.

The two output shaft rotation sensors 103 and 104 also illustrated in FIG. 5 detect the rotation speed and the rotation direction of the output shaft 22 and thus the propeller 5, and it is possible to execute control suitable for the rotation direction of the propeller 5. The number of output shaft rotation sensors is not limited as long as they are capable of detecting both the rotation speed and rotation direction of an object.

In addition, the controller 100 is configured in such a manner that any of the aforementioned six modes can be artificially selected and executed. For example, the mode change switch 107 such as a touch panel type is prepared in the instrument panel equipped in the driver's seat, and this is electrically connected.

In the first embodiment, the GM 30 also has a function as a starter for starting the ICE 16. In other words, as illustrated in the flowchart of FIG. 16, when starting the ICE 16, the key switch is turned on (S1: YES), and the controller or the like is started by the power supply of the power supply device 98 (the electric system is started up).

Next, if the ICE start button 106 is turned on (S2: YES) and the control lever 14 is in the neutral state based on the detection information of the transmission potentiometer 102 (S3: YES), the connection switching mechanism 37 drives the clutch actuator 99 in such a manner that the clutch shifter 38 engages with the second switching gear 40 (S4), and the switching element in the inverter 29 is turned ON/OFF to drive the GM 30 as an electric motor (S5).

Then, the power of the GM 30 is transmitted to the transmission gear 23a on the input shaft 21 connected to the flywheel 17 of the ICE 16 via the intermediate gear pair 34, the second switching gear 40, the second transmission gear pair 43 and the transmission gear 24a. As a result, the input shaft 21 starts to rotate, and so-called cranking is executed. The reason why the clutch shifter 38 is engaged with the second switching gear 40 is to transmit the power of the GM 30 to the input shaft 21 in a state of high speed and low torque, and to smoothly rotate the input shaft 21.

Next, if the rotation speed of the ICE 16 obtained from the detection information of the ICE rotation sensor 105 exceeds a preset complete explosion threshold (S6: YES), assuming that the ICE 16 has completely exploded, the clutch actuator 99 is driven in such a manner that the clutch shifter 38 is in the neutral (disengaged) state (S7), and the drive of the GM 30 is stopped (S8). This completes the startup of the ICE 16.

If the rotation speed of the ICE 16 does not exceed the complete explosion threshold even after a predetermined time has elapsed (S9: YES), assuming that the ICE 16 has not completely exploded, in order to suppress the waste of fuel and protect the GM 30 and the power supply device 98, the clutch actuator 99 is driven (S7) in such a manner that the clutch shifter 38 is in the neutral state, and the drive of the GM 30 is stopped (S8).

By such a control, the power of the ICE 16 and the power of the GM 30 can be used in combination to improve the driving efficiency, and for example, even if there is no starter motor, the GM 30 can be effectively used to start the ICE 16 smoothly, the number of parts can be suppressed, and the cost can be reduced.

When the ICE 16 is started, it is preferable to control in such a manner that the duty ratio of the PWM signal (the ratio of the ON (energization) time to one cycle of switching) is changed in accordance with the voltage of the power supply device 98, to make the duty ratio smaller as the voltage of the power supply device 98 becomes lower, and the drive current when driving the GM 30 as an electric motor is made to be low. In this way, an abnormal drop in the voltage of the power supply device 98 due to a rapid increase in drive current can be prevented.

Figure 17:
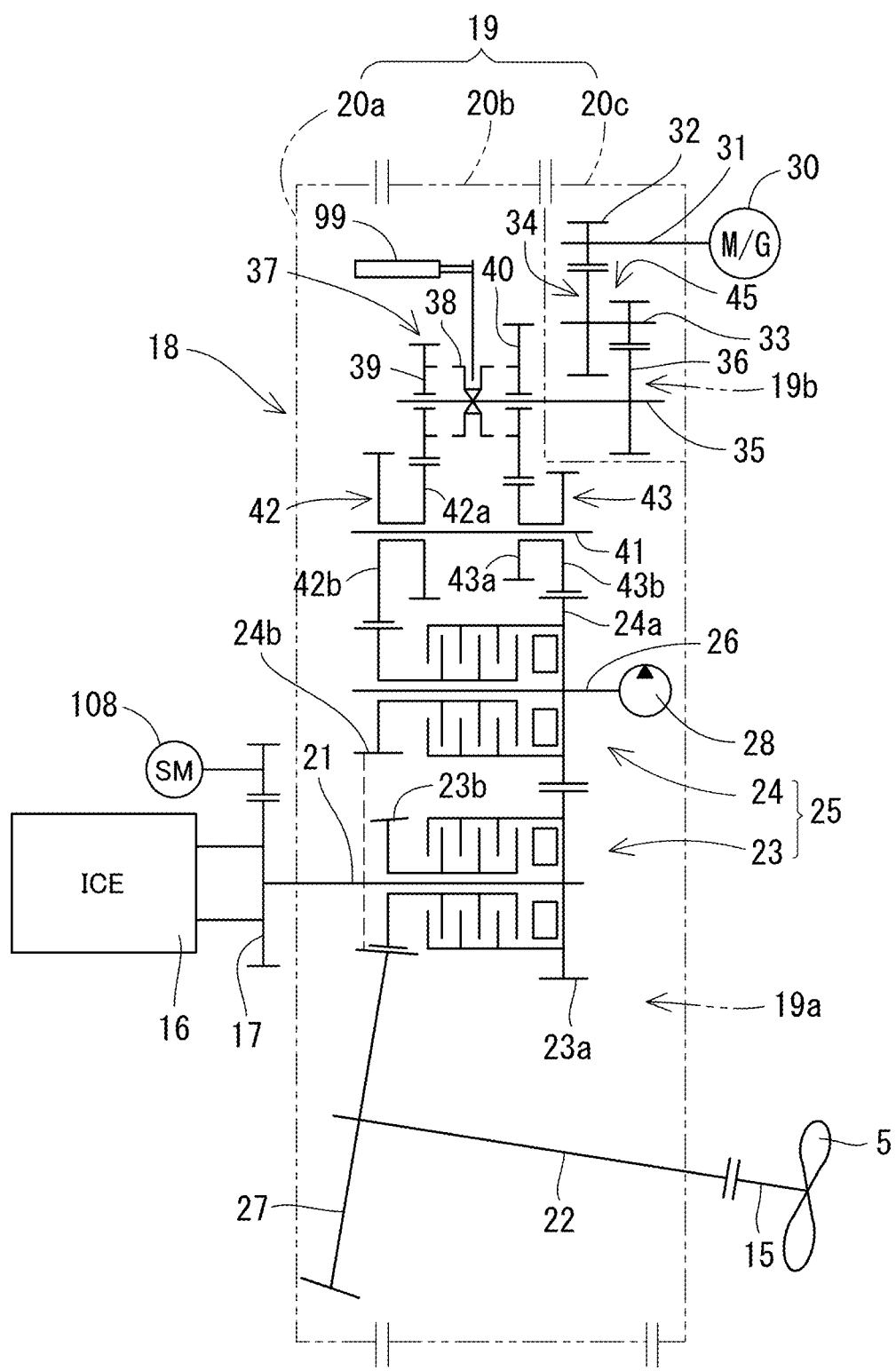
FIG. 17 is a skeleton diagram illustrating a power transmission system of a marine propulsion apparatus in a fourth embodiment.
Figure 18:
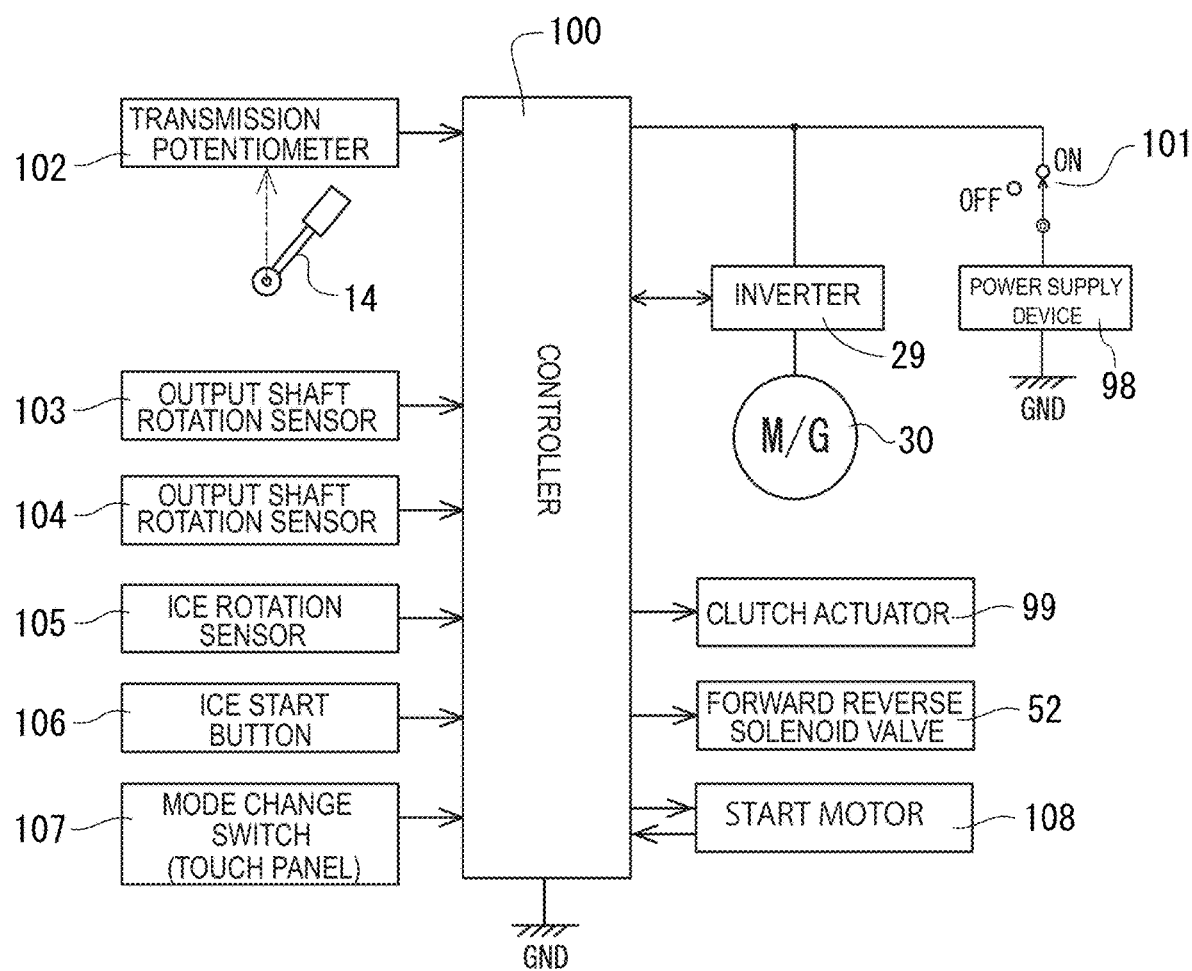
FIG. 18 is a functional block diagram of a controller used in a marine propulsion apparatus of the present invention (second example)
Figure 19:
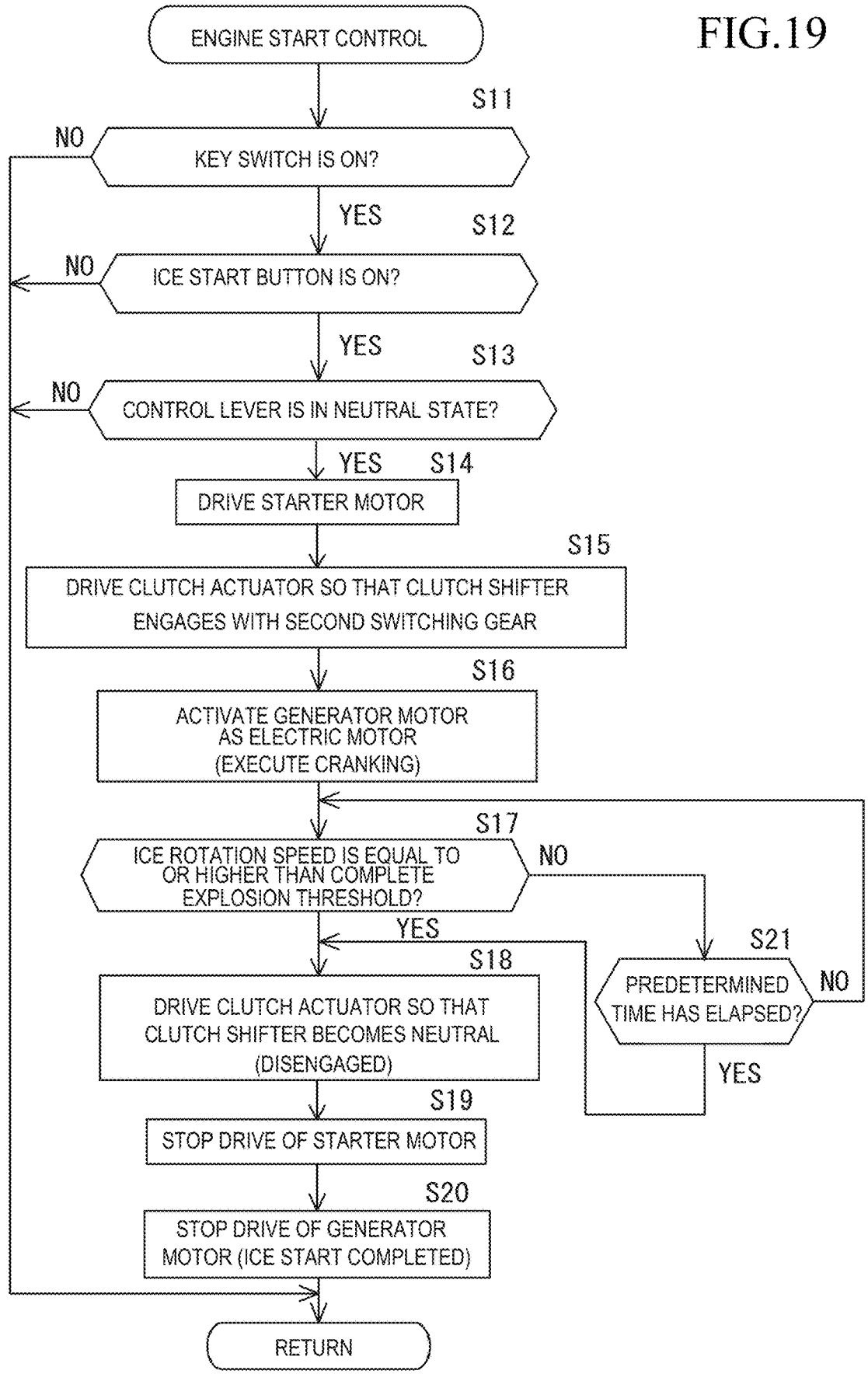
FIG. 19 is a flowchart of the control of the marine propulsion apparatus of the present invention for starting an ICE in the functional block diagram (second example)

FIG. 17 to FIG. 19 illustrate a sixth embodiment that is another example of the ICE 16 starting structure of the first embodiment. A starter motor 108 for starting the ICE 16 is electrically connected to the controller 100 of the sixth embodiment. The starter motor 108 is attached to the ICE 16. The ring gear of the flywheel 17 is engaged with the pinion gear of the starter motor 108. When starting the ICE 16, the ring gear of the flywheel 17 is rotated by the rotational force of the starter motor 108, and the crank shaft of the ICE 16 starts to rotate (cranking is executed).

In this case, the driving force of the starter motor 108 plays the main role in starting the ICE 16. The power of the GM 30 as an electric motor can also be effectively used to assist the starter motor 108 driving force. In other words, as illustrated in the flowchart of FIG. 19, when starting the ICE 16, the key switch is turned on (S11: YES), and the controller or the like is started by the power supply of the power supply device 98 (the electric system is started up).

Next, if the ICE start button 106 is turned on (S12: YES) and the control lever 14 is in the neutral state (S13: YES), the starter motor 108 is driven, the crank shaft of the ICE 16 starts to rotate, and so-called cranking is executed (S14). Then, the clutch actuator 99 is driven in such a manner that the clutch shifter 38 engages with the second switching gear 40 (S15), the switching element in the inverter 29 is turned ON/OFF, and the GM 30 is driven as an electric motor (S16).

Then, the power of the GM 30 is transmitted to the transmission gear 23*a* on the input shaft 21 connected to the flywheel 17 of the ICE 16 via the intermediate gear pair 34, the second switching gear 40, the second transmission gear pair 43 and the transmission gear 24*a*. As a result, the power of the GM 30 assists the driving force of the starter motor 108, and the crank shaft of the ICE 16 is rotated. The reason why the clutch shifter 38 is engaged with the second switching gear 40 is the same as that in the ICE 16 starting structure of the first embodiment.

Next, if the rotation speed of the ICE 16 obtained from the detection information of the ICE rotation sensor 105 exceeds a preset complete explosion threshold (S17: YES), assuming that the ICE 16 has completely exploded, the drive of the starter motor 108 is stopped (S18), the clutch actuator 99 is driven in such a manner that the clutch shifter 38 is in the neutral (disengaged) state (S19), and the drive of the GM 30 is stopped (S20). This completes the startup of the ICE 16.

If the rotation speed of the ICE 16 does not exceed the complete explosion threshold even after a predetermined time has elapsed (S21: YES), assuming that the ICE 16 has not completely exploded, in order to suppress the waste of fuel and protect the GM 30 and the power supply device 98, the drive of the starter motor 108 is stopped (S18), the clutch actuator 99 is driven (S19) in such a manner that the clutch shifter 38 is in the neutral state, and the drive of the GM 30 is stopped (S20).

By such a control, the power of the GM 30 can be supplemented to the driving force of the starter motor 108, and thus there is an advantage that the ICE 16 start time can be shortened while reducing the capacity of the starter motor 108.

Figure 20:
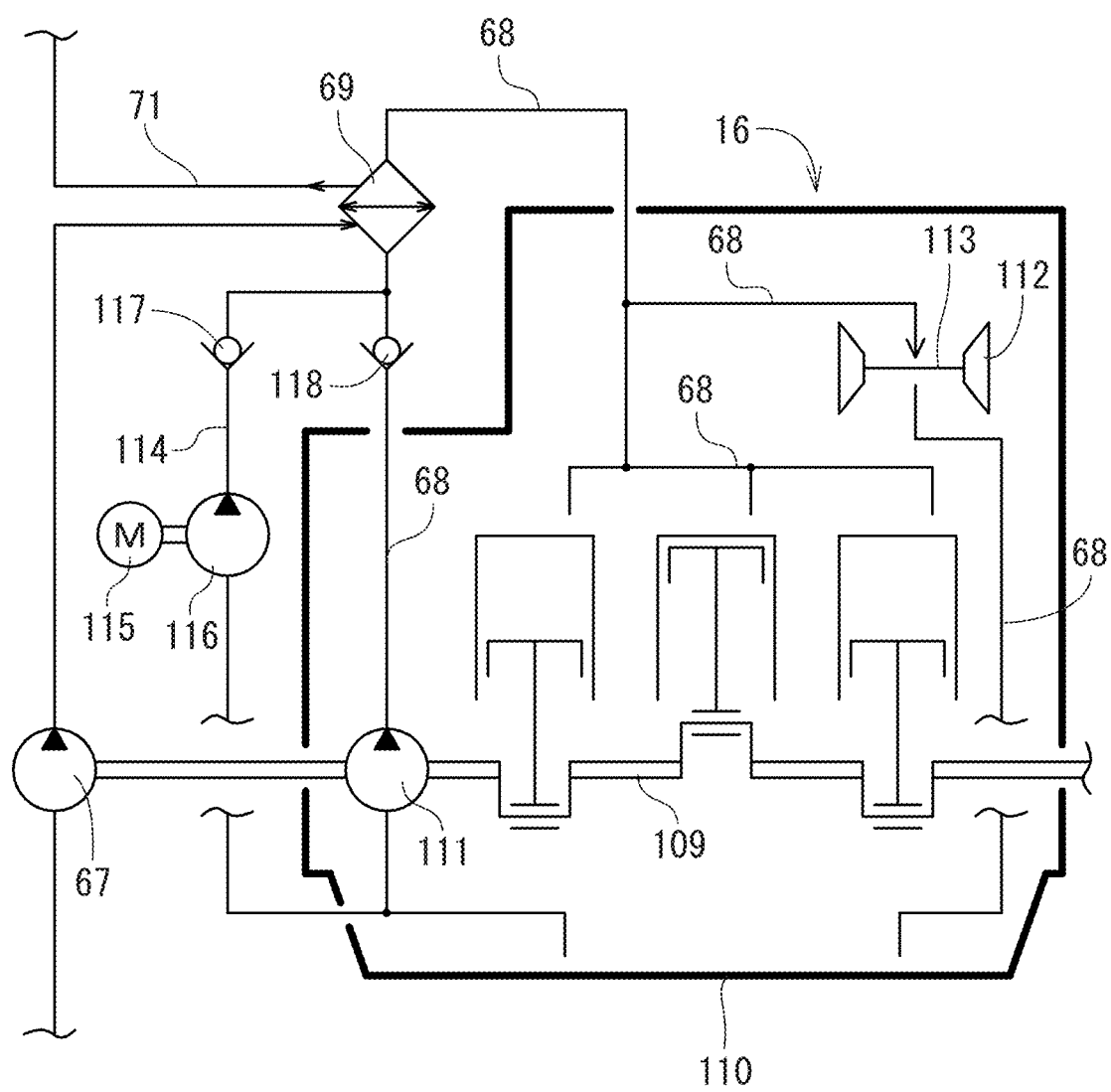
FIG. 20 is an illustration of a lubrication structure of a turbocharged ICE.

FIG. 20 illustrates a seventh embodiment that is another example of the hydraulic circuit structure of the first embodiment. In the seventh embodiment, the lubrication cooling passage 68 of the ICE 16 is composed of a communication hole drilled in the ICE 16 and a pipe disposed outside the ICE 16. The lubrication cooling passage 68 includes an ICE oil pump 111 that supplies oil to a rotary shaft 113 of a turbocharger 112, each cylinder, a crank shaft 109, and the like. The ICE oil pump 111 is configured to be driven by the rotation of the crank shaft 109 of the ICE 16.

Both ends in the distribution direction in the lubrication cooling passage 68 are connected to an oil pan 110 of the ICE 16. In the lubrication cooling passage 68, the ICE cooling cooler 69 is disposed on the downstream side of the ICE oil pump and on the upstream side of the rotary shaft 113 of the turbocharger 112, each cylinder, and the like. The oil (lubricating oil) sucked up from the oil pan 110 by the ICE oil pump 111 is cooled by the ICE cooling cooler 69 and then supplied to the rotary shaft 113 of the turbocharger 112, each cylinder, and the like to lubricate them, and after that, the oil is returned to the oil pan 110.

The lubrication cooling passage 68 of the seventh embodiment includes a pump bypass passage 114 that bypasses the ICE oil pump 111. An auxiliary oil pump 116 driven by the power of an electric motor 115 that is a separate drive source from the ICE 16 is provided in the middle of the pump bypass passage 114. A check valve 117 that blocks backflow in the direction of the auxiliary oil pump 116 is disposed on the ejection side of the auxiliary oil pump 116 in the pump bypass passage 114. A check valve 118 that blocks backflow in the direction of the ICE oil pump 111 is disposed between the ICE oil pump 111 and the ICE cooling cooler 69 in the lubrication cooling passage 68.

The seventh embodiment is configured in such manner that when the ICE 16 is stopped, the electric motor 115 is actuated for a predetermined time. With this configuration, even when the ICE oil pump 111 is stopped, the rotary shaft 113 of the turbocharger 112 and each cylinder can be lubricated by driving the auxiliary oil pump 116 by the electric motor 115. For example, even when the ICE 16 is stopped immediately after high-load operation, lubricating oil can be supplied to the turbocharger 112 for a predetermined time, and problems due to oil carbonization can be prevented.

In addition, in the seventh embodiment, when the ICE 16 is stopped for a long time, the electric motor 115 may be actuated intermittently after a predetermined time. With this configuration, without driving the ICE oil pump 111, the rotary shaft 113 of the turbocharger 112 and each cylinder can be lubricated by driving the auxiliary oil pump 116, and fretting of each part of the ICE 16 can be prevented.

The configuration of each component in the present invention is not limited to the illustrated embodiments, and various changes can be made without departing from the spirit of the present invention.

DESCRIPTION OF REFERENCE NUMERALS

1 yacht (ship)
5 propeller
15 propulsion shaft
16 internal combustion engine (ICE)
18 marine propulsion apparatus
21 input shaft
22 output shaft
23 forward clutch
24 reverse clutch
25 forward reverse switching mechanism
30 generator motor (GM)
37 connection switching mechanism

The invention claimed is:

1. A marine propulsion apparatus that can-transmits power of an internal combustion engine mounted on a ship to a propeller via a forward reverse switching mechanism, the marine propulsion apparatus comprising:
- a generator motor; and
  - a connection switching mechanism capable of selectively connecting the generator motor to a power input side and a power output side of the forward reverse switching mechanism,
- wherein the connection switching mechanism is interposed between the generator motor and the forward reverse switching mechanism,
- wherein in a state where the generator motor is connected to the output side of the forward reverse switching mechanism by the connection switching mechanism, when the forward reverse switching mechanism is neutral, the propeller is driven by power of the generator motor, or the generator motor is operated as a generator by an idle force of the propeller due to a tidal current.

2. The marine propulsion apparatus according to claim 1, wherein in a state where the generator motor is connected to the power input side of the forward reverse switching mechanism by the connection switching mechanism, when the power of the internal combustion engine is transmitted to the propeller via the forward reverse switching mechanism, the generator motor can assists the internal combustion engine, and when the forward reverse switching mechanism is neutral, the generator motor is operated as a generator by the power of the internal combustion engine.

3. A marine propulsion apparatus that transmits power of an internal combustion engine mounted on a ship to a propeller via a forward reverse switching mechanism, the marine propulsion apparatus comprising:
- a generator motor; and
  - a connection switching mechanism capable of selectively connecting the generator motor to a power input side and a power output side of the forward reverse switching mechanism,
- wherein the connection switching mechanism is interposed between the generator motor and the forward reverse switching mechanism,
- wherein the connection switching mechanism includes a first gear train and a second gear train, respective input gears thereof being configured to be alternatively engaged with and disengaged from the generator motor,
- wherein the forward reverse switching mechanism includes an input shaft coupled to the internal combustion engine, a forward clutch on the input shaft, a forward rotation output gear that transmits the power of the internal combustion engine to a reduction output gear on a propeller side by an engagement of the forward clutch, a reverse rotation shaft parallel to the input shaft, a transmission gear pair that couples the reverse rotation shaft and the input shaft, a reverse clutch on the reverse rotation shaft, and a reverse output gear that transmits the power of the internal combustion engine to the reduction output gear by an engagement of the reverse clutch,
- wherein the input side is the transmission gear pair, and the output side is the forward rotation output gear and the reverse rotation output gear,
- wherein an output gear of the first gear train is meshed with the forward rotation output gear or the reverse rotation output gear, and
- wherein an output gear of a second gear train is set to have a specification of meshing with one of the transmission gear pair and a specification of meshing with an other of the transmission gear pair.

4. The marine propulsion apparatus according to claim 3, wherein a reduction ratio of the first gear train is set to be larger than a reduction ratio of the second gear train.

5. A marine propulsion apparatus that transmits power of an internal combustion engine mounted on a ship to a propeller via a forward reverse switching mechanism, the marine propulsion apparatus comprising:
- a generator motor; and
  - a connection switching mechanism capable of selectively connecting the generator motor to a power input side and a power output side of the forward reverse switching mechanism,
- wherein the connection switching mechanism is interposed between the generator motor and the forward reverse switching mechanism,
  - wherein a housing that houses the forward reverse switching mechanism and the connection switching mechanism is formed by connecting a first cover body in which the internal combustion engine is installed, an intermediate case body, and a second cover body in which the generator motor is installed, an inside of the housing being formed with a first chamber surrounded by the first cover body and the intermediate case body, and a second chamber surrounded by the intermediate case body and the second cover body, and
  - wherein the first chamber houses the forward reverse switching mechanism and the connection switching mechanism, while the second chamber houses a transmission mechanism that couples the generator motor and the connection switching mechanism in such a manner that power is transmitted.

6. The marine propulsion apparatus according to claim 5, wherein an operation unit of the connection switching mechanism is disposed in an upper part of the first chamber of the housing, an actuator that switches and actuates the operation unit is disposed on a side of the generator motor, and an operation system that couples both is provided on an upper surface side of the housing.

7. The marine propulsion apparatus according to claim 1,
- wherein the connection switching mechanism includes a first switching gear and a second switching gear, those gears being configured to be alternatively engaged with and disengaged from the generator motor,
- wherein the forward reverse switching mechanism includes an input shaft coupled to the internal combustion engine, a forward clutch on the input shaft, a forward rotation output gear that transmits the power of the internal combustion engine to a reduction output gear on a propeller side by an engagement of the forward clutch, a reverse rotation shaft parallel to the input shaft, a transmission gear pair that couples the reverse rotation shaft and the input shaft, a reverse-clutch on the reverse rotation shaft, and a reverse rotation output gear that transmits the power of the internal combustion engine to the reduction output gear by an engagement of the reverse clutch,
- wherein the input side is the transmission gear pair, and the output side is the forward rotation output gear and the reverse rotation output gear,
- wherein the forward rotation output gear and the reduction output gear are a conical gear pair, and an output shaft to which the reduction output gear is fixed is tilted with respect to the input shaft, wherein the first switching gear is meshed with the forward rotation output gear, as a reverse conical gear, and wherein the second switching gear is meshed with one or an other of the transmission gear pair.

* * * * *